US011462757B2

(12) United States Patent
Ikeda

(10) Patent No.: US 11,462,757 B2
(45) Date of Patent: Oct. 4, 2022

(54) FUEL CELL SYSTEM

(71) Applicant: TOYOTA JIDOSHA KABUSHIKI KAISHA, Toyota (JP)

(72) Inventor: Koichiro Ikeda, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 206 days.

(21) Appl. No.: 17/029,259

(22) Filed: Sep. 23, 2020

(65) Prior Publication Data
US 2021/0135261 A1 May 6, 2021

(30) Foreign Application Priority Data

Nov. 5, 2019 (JP) .............................. JP2019-200875

(51) Int. Cl.
| | |
|---|---|
| *H01M 8/04* | (2016.01) |
| *H01M 8/04746* | (2016.01) |
| *H01M 8/04029* | (2016.01) |
| *H01M 8/04007* | (2016.01) |
| *H01M 8/0432* | (2016.01) |

(Continued)

(52) U.S. Cl.
CPC ............... *H01M 8/04768* (2013.01); *H01M 8/04029* (2013.01); *H01M 8/04067* (2013.01); *H01M 8/04358* (2013.01); *H01M 8/04388* (2013.01); *H01M 8/04582* (2013.01); *H01M 8/04611* (2013.01); *H01M 8/04671* (2013.01); *H01M 8/04932* (2013.01); *H01M 8/241* (2013.01); *H01M 2008/1095* (2013.01); *H01M 2250/20* (2013.01)

(58) Field of Classification Search
CPC ......... H01M 8/04768; H01M 8/04029; H01M 8/04067; H01M 8/04358; H01M 8/04388; H01M 8/04582; H01M 8/04611; H01M 8/04932
USPC ......................................................... 429/431
See application file for complete search history.

(56) References Cited

U.S. PATENT DOCUMENTS

2007/0298298 A1* 12/2007 Ishigaki ............ H01M 8/04014
429/429
2009/0191437 A1* 7/2009 Maeshima ........ H01M 8/04029
429/434

(Continued)

FOREIGN PATENT DOCUMENTS

JP 2011-008916 A 1/2011
JP 2011-243424 A 12/2011

*Primary Examiner* — James M Erwin
(74) *Attorney, Agent, or Firm* — Finnegan, Henderson, Farabow, Garrett & Dunner, LLP

(57) ABSTRACT

A fuel cell system includes first and second fuel cells, first and second coolers cooling coolant, first and second coolant supply path from the coolers to the fuel cells, first and second coolant discharge paths from the fuel cells to the coolers, a detour path connecting the first coolant supply path and the first coolant discharge path bypassing the first cooler, an adjusting device adjusting a flow rate of coolant of the detour path, first and second connection paths connecting the coolant supply paths and the coolant discharge paths, first and second opening/closing valves in the connection paths, and a controller configured to, when there is a possibility of flooding, suspend power generation of the first fuel cell and control the adjusting device or the first cooling device such that a temperature of the coolant of the first fuel cell increases, and open the opening/closing valves.

17 Claims, 21 Drawing Sheets

(51) Int. Cl.
*H01M 8/04858* (2016.01)
*H01M 8/04537* (2016.01)
*H01M 8/0438* (2016.01)
*H01M 8/241* (2016.01)
*H01M 8/04664* (2016.01)
*H01M 8/10* (2016.01)

(56) References Cited

U.S. PATENT DOCUMENTS

2011/0159393 A1* 6/2011 Takemoto ......... H01M 8/04037
429/442
2015/0017559 A1* 1/2015 Klewer ............. H01M 8/04067
429/435
2015/0236361 A1* 8/2015 Kells ................... H01M 8/2484
429/434
2018/0287175 A1* 10/2018 Lee ................... H01M 8/04358

* cited by examiner

FUEL CELL SYSTEM

CROSS-REFERENCE TO RELATED APPLICATION

This application is based upon and claims the benefit of priority of the prior Japanese Patent Application No. 2019-200875, filed on Nov. 5, 2019, the entire contents of which are incorporated herein by reference.

FIELD OF THE INVENTION

The present disclosure relates to a fuel cell system.

BACKGROUND

For example, when a fuel cell stack is excessively cooled, the amount of saturated water vapor decreases with the decrease in temperature. This causes water vapor produced by power generation of the fuel cell to condense into liquid water, and flooding may thereby occur in the fuel cell. As a countermeasure against the above, a technique that prevents excessive cooling of the fuel cell stack by reducing the flow rate of coolant is suggested as disclosed in, for example, Japanese Patent Application Publication No. 2011-243424.

SUMMARY OF THE INVENTION

The aforementioned technique allows the temperature of the unit cell near the inlet of the coolant of the fuel cell stack to be appropriately controlled. However, since the flow rate of the coolant decreases, the temperature of the unit cell near the outlet of the coolant of the fuel cell stack may excessively increase because of decrease in the heat capacity of the coolant, thereby deteriorating the electrolyte membrane of the unit cell.

It is therefore an object of the present disclosure to provide a fuel cell system capable of inhibiting overheating of the fuel cell and flooding in the fuel cell.

The above object is achieved by a fuel cell system including: a first fuel cell and a second fuel cell, each generating electric power by using fuel gas and oxidant gas; a first cooling device that cools coolant that has cooled the first fuel cell and a second cooling device that cools coolant that has cooled the second fuel cell; a first coolant supply path through which coolant flows from the first cooling device to the first fuel cell; a first coolant discharge path through which coolant flows from the first fuel cell to the first cooling device; a second coolant supply path through which coolant flows from the second cooling device to the second fuel cell; a second coolant discharge path through which coolant flows from the second fuel cell to the second cooling device; a first detour path connected between the first coolant supply path and the first coolant discharge path so as to bypass the first cooling device; a first adjusting device that adjusts a flow rate of coolant flowing through the first detour path; a first connection path connecting one of the first coolant supply path and the first coolant discharge path and one of the second coolant supply path and the second coolant discharge path; a second connection path connecting the other of the first coolant supply path and the first coolant discharge path and the other of the second coolant supply path and the second coolant discharge path; a first opening/closing valve disposed in the first connection path and a second opening/closing valve disposed in the second connection path; and a controller configured to control the first fuel cell, the second fuel cell, the first cooling device, the second cooling device, the first adjusting devices, the first opening/closing valve, and the second opening/closing valve, wherein the controller is configured to: determine whether there is a possibility of occurrence of flooding in the first fuel cell and the second fuel cell due to power generation of the first fuel cell and the second fuel cell, and when determining that there is a possibility of occurrence of flooding in the first fuel cell and the second fuel cell, suspend the power generation of the first fuel cell and control the first adjusting device or the first cooling device such that a temperature of the coolant cooling the first fuel cell increases, and open the first opening/closing valve and the second opening/closing valve.

In the above configuration, when determining that there is a possibility of occurrence of flooding in the first fuel cell and the second fuel cell, the controller suspends the power generation of the first fuel cell. Thus, the controller is able to inhibit occurrence of flooding in the first fuel cell by inhibiting production of liquid water in the first fuel cell.

In addition, in this case, the controller controls the first adjusting device or the first cooling device such that the temperature of the coolant for cooling the first fuel cell increases, and opens the first opening/closing valve and the second opening/closing valve. Thus, the high-temperature coolant flows into the cooling system including the second coolant supply path and the second coolant discharge path from the cooling system including the first coolant supply path and the first coolant discharge path. Therefore, excessive cooling of the second fuel cell is inhibited, and occurrence of flooding in the second fuel cell is thereby inhibited.

In addition, since the flow rate of the coolant flowing into the second fuel cell increases by opening the first opening/closing valve and the second opening/closing valve, the heat capacity of the coolant increases. Thus, the temperature increase of the unit cell near the outlet of the coolant of the second fuel cell is reduced. Therefore, in the above configuration, overheating of the first and second fuel cells and flooding in the first and second fuel cells are inhibited.

In the above configuration, the controller may be configured to stop cooling operation of the first cooling device when suspending the power generation of the first fuel cell.

In the above configuration, the controller may be configured to cause the first adjusting device to increase the flow rate of the coolant such that the coolant does not flow through the first cooling device when suspending the power generation of the first fuel cell.

In the above configuration, the controller may be configured to increase electric power generated by the second fuel cell according to a decline in generated electric power due to suspension of the power generation of the first fuel cell.

In the above configuration, the fuel cell system may further comprise a control valve that is disposed in the first coolant supply path and controls a flow of coolant into the first fuel cell, and the controller may be configured to close the control valve when opening the first opening/closing valve and the second opening/closing valve.

In the above configuration, the controller may be configured to, after controlling the first adjusting device or the first cooling device such that a temperature of the coolant of the first fuel cell decreases, open the control valve and close the first opening/closing valve and the second opening/closing valve to resume the power generation of the first fuel cell.

In the above configuration, the fuel cell system may further include a cooling temperature measurement device that measures a temperature of coolant, and the controller may be configured to close the first opening/closing valve and the second opening/closing valve and open the control valve when a temperature measured by the cooling temperature measurement device becomes less than a predetermined value after controlling the first adjusting device or the first cooling device such that the temperature of the coolant of the first fuel cell decreases.

In the above configuration, the controller may be configured to: after resuming the power generation of the first fuel cell, determine whether there is a possibility of occurrence of flooding in the second fuel cell due to power generation of the second fuel cell, and when there is a possibility of occurrence of flooding in the second fuel cell, open the first opening/closing valve and the second opening/closing valve.

In the above configuration, the controller may be configured to determine that there is a possibility of occurrence of flooding in the first fuel cell and the second fuel cell when an output current value required of the first fuel cell and the second fuel cell is less than a threshold value.

In the above configuration, the fuel cell system may further include: a first cell temperature measurement device that measures a temperature of the first fuel cell; and a second cell temperature measurement device that measures a temperature of the second fuel cell, and the controller may be configured to determine that there is a possibility of occurrence of flooding in the first fuel cell and the second fuel cell when a temperature measured by the first cell temperature measurement device or a temperature measured by the second cell temperature measurement is equal to or less than a temperature reference value.

In the above configuration, the controller may be configured to determine the temperature reference value according to the output current value required of the first fuel cell and the second fuel cell.

In the above configuration, the fuel cell system may further include a first detection device that detects a pressure loss of fuel gas flowing through the first fuel cell; and a second detection device that detects a pressure loss of fuel gas flowing through the second fuel cell, and the controller may be configured to determine a pressure reference value according to the output current value required of the first fuel cell and the second fuel cell, and when the pressure loss detected by the first detection device or the pressure loss detected by the second detection device is greater than the pressure reference value, determine that there is a possibility of occurrence of flooding in the first fuel cell and the second fuel cell.

In the above configuration, the first fuel cell system may further include a first cell temperature measurement device that measures a temperature of the first fuel cell; and a second cell temperature measurement device that measures a temperature of the second fuel cell, and the controller may be configured to determine that the pressure reference value according to the temperature measured by the first cell temperature measurement device or the temperature measured by the second cell temperature measurement device and the output current value.

In the above configuration, the fuel cell system may further include: a third fuel cell that generates electric power by using fuel gas and oxidant gas; a third cooling device that cools coolant that has cooled the third fuel cell; a third coolant supply path through which coolant flows from the third cooling device to the third fuel cell; a third coolant discharge path through which coolant flows from the third fuel cell to the third cooling device; a third connection path connecting one of the first coolant supply path and the first coolant discharge path and one of the third coolant supply path and the third coolant discharge path; a fourth connection path connecting the other of the first coolant supply path and the first coolant discharge path and the other of the third coolant supply path and the third coolant discharge path; and a third opening/closing valve disposed in the third connection path and a fourth opening/closing valve disposed in the fourth connection path, and the controller may be configured to: determine whether there is a possibility of occurrence of flooding in the first fuel cell, the second fuel cell, and the third fuel cell due to power generation of the first fuel cell, the second fuel cell, and the third fuel cell, and when determining that there is a possibility of occurrence of flooding in the first fuel cell, the second fuel cell, and the third fuel cell, suspend the power generation of the first fuel cell, control the first adjusting device or the first cooling device such that a temperature of the coolant cooling the first fuel cell increases, and opens the first opening/closing valve, the second opening/closing valve, the third opening/closing valve, and the fourth opening/closing valve.

In the above configuration, the controller may be configured to increase electric power generated by the second fuel cell and the third fuel cell according to a decline in generated electric power due to suspension of the power generation of the first fuel cell.

In the above configuration, the fuel cell system may further include: a second detour path connected between the third coolant supply path and the third coolant discharge path so as to bypass the third cooling device; a second adjusting device that adjusts a flow rate of coolant flowing through the second detour path; a fifth connection path connecting one of the second coolant supply path and the second coolant discharge path and one of the third coolant supply path and the third coolant discharge path; a sixth connection path connecting the other of the second coolant supply path and the second coolant discharge path and the other of the third coolant supply path and the third coolant discharge path; a fifth opening/closing valve disposed in the fifth connection path and a sixth opening/closing valve disposed in the sixth connection path, and when determining that there is a possibility of occurrence of flooding in the first fuel cell, the second fuel cell, and the third fuel cell, the controller may be configured to suspend the power generation of the first fuel cell and the third fuel cell, control the first adjusting device or the first cooling device such that a temperature of the coolant cooling the first fuel cell increases, control the second adjusting device or the second cooling device such that a temperature of the coolant cooling the third fuel cell increases, and open the third opening/closing valve, the fourth opening/closing valve, the fifth opening/closing valve, and the sixth opening/closing valve.

In the above configuration, the controller may be configured to increase electric power generated by the second fuel cell according to a decline in generated electric power due to suspension of power generation of the first fuel cell and the third fuel cell.

EFFECTS OF THE INVENTION

According to the present disclosure, it is possible to provide a fuel cell system capable of inhibiting overheating of the fuel cell and flooding in the fuel cell.

DETAILED DESCRIPTION

[Configuration of a Fuel Cell System]

Figure 1:
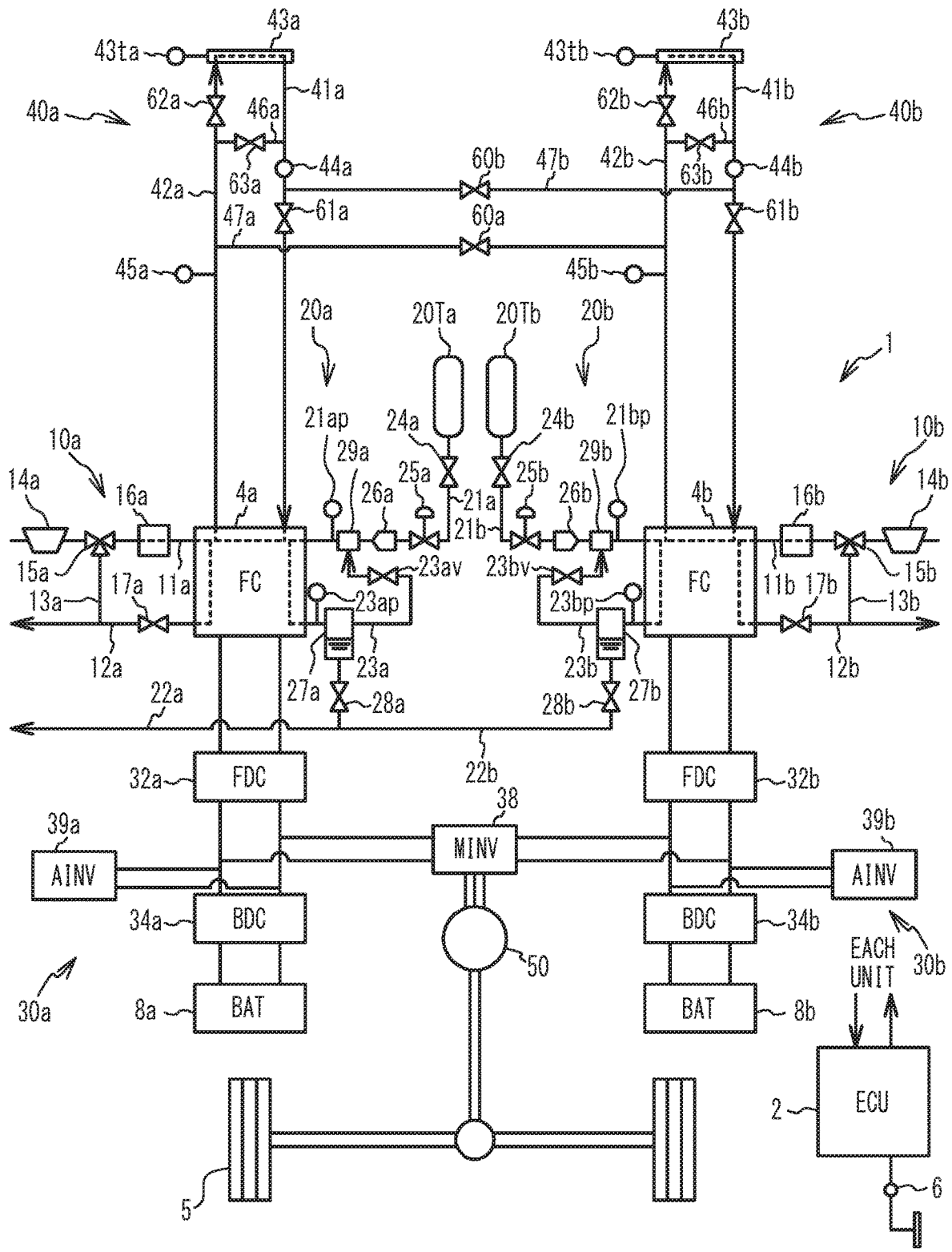
FIG. 1 is a configuration diagram of a fuel cell system mounted on a vehicle.

FIG. 1 is a configuration diagram of a fuel cell system (hereinafter, simply referred to as a system) 1 mounted on a vehicle. The system 1 includes an ECU 2, fuel cells (hereinafter, referred to as FCs) 4a and 4b, secondary batteries (hereinafter, referred to as BATs) 8a and 8b, cathode gas supply systems 10a and 10b, anode gas supply systems 20a and 20b, cooling systems 40a and 40b, electric power control systems 30a and 30b, and a motor 50.

The FCs 4a and 4b are fuel cells that are supplied with cathode gas and anode gas to generate electric power. In the present embodiment, air containing oxygen is used as the cathode gas, and hydrogen gas is used as the anode gas. Each of the FCs 4a and 4b includes a plurality of solid polymer electrolyte unit cells that is stacked. In the present embodiment, the FCs 4a and 4b are identical to each other, and have the same rated output, but this does not intend to suggest any limitation. The FCs 4a and 4b are examples of first and second fuel cells.

The cathode gas supply systems 10a and 10b supply air containing oxygen, as the cathode gas, to the FCs 4a and 4b, respectively. Specifically, the cathode gas supply system 10a includes a supply pipe 11a, a discharge pipe 12a, a bypass pipe 13a, an air compressor 14a, a bypass valve 15a, an intercooler 16a, and a back pressure valve 17a, while the cathode gas supply system 10b includes a supply pipe 11b, a discharge pipe 12b, a bypass pipe 13b, an air compressor 14b, a bypass valve 15b, an intercooler 16b, and a back pressure valve 17b.

The supply pipes 11a and 11b are connected to the cathode inlet manifolds of the FCs 4a and 4b, respectively. The discharge pipes 12a and 12b are connected to the cathode outlet manifolds of the FCs 4a and 4b, respectively. The supply pipe 11a and the discharge pipe 12a are communicated with each other through the bypass pipe 13a, while the supply pipe 11b and the discharge pipe 12b are communicated with each other through the bypass pipe 13b. The bypass valve 15a is disposed in the part where the supply pipe 11a and the bypass pipe 13a are connected, while the bypass valve 15b is disposed in the part where the supply pipe 11b and the bypass pipe 13b are connected. The bypass valve 15a changes the communication state between the supply pipe 11a and the bypass pipe 13a, while the bypass valve 15b changes the communication state between the supply pipe 11b and the bypass pipe 13b. The air compressor 14a, the bypass valve 15a, and the intercooler 16a are disposed in the supply pipe 11a in this order from the upstream side. The back-pressure valve 17a is disposed in the discharge pipe 12a, and is located further upstream than the part where the discharge pipe 12a and the bypass pipe 13a are connected. Similarly, the air compressor 14b, the bypass valve 15b, and the intercooler 16b are disposed in the supply pipe 11b in this order from the upstream side. The back-pressure valve 17b is disposed in the discharge pipe 12b, and is located further upstream than the part where the discharge pipe 12b and the bypass pipe 13b are connected.

The air compressors 14a and 14b supply air containing oxygen, as the cathode gas, to the FCs 4a and 4b through the supply pipes 11a and 11b, respectively. The cathode gas supplied to the FCs 4a and 4b are discharged from the discharge pipes 12a and 12b, respectively. The intercoolers 16a and 16b cool the cathode gas supplied to the FCs 4a and 4b, respectively. The back-pressure valves 17a and 17b adjust the back pressures at the cathode sides of the FCs 4a and 4b, respectively. Air is an example of oxidant gas.

The anode gas supply systems 20a and 20b supply hydrogen gas, as the anode gas, to the FCs 4a and 4b, respectively. Specifically, the anode gas supply system 20a includes a tank 20Ta, a supply pipe 21a, a discharge pipe 22a, a return pipe 23a, a tank valve 24a, a regulating valve 25a, an injector (hereinafter, referred to as an INJ) 26a, a gas-liquid separator 27a, a discharge valve 28a, and an ejector 29a, while the anode gas supply system 20b includes a tank 20Tb, a supply pipe 21b, a discharge pipe 22b, a return pipe 23b, a tank valve 24b, a regulating valve 25b, an INJ 26b, a gas-liquid separator 27b, a discharge valve 28b, and an ejector 29b. The hydrogen gas is an example of fuel gas.

The tanks 20Ta and 20Tb store hydrogen gas in a high-pressure state therein. The tank 20Ta is connected to the anode inlet manifold of the FC 4a through the supply pipe 21a. Similarly, the tank 20Tb is connected to the anode inlet manifold of the FC 4b through the supply pipe 21b. The tanks 20Ta and 20Tb store hydrogen gas therein. The discharge pipes 22a and 22b are connected to the anode outlet manifolds of the FCs 4a and 4b, respectively. The gas-liquid separator 27a and the supply pipe 21a are communicated with each other through the return pipe 23a, while the gas-liquid separator 27b and the supply pipe 21b are communicated with each other through the return pipe 23b.

The tank valve 24a, the regulating valve 25a, the INJ 26a, and the ejector 29a are disposed in the supply pipe 21a in this order from the upstream side. While the tank valve 24a is opened, the open degree of the regulating valve 25a is adjusted, and the INJ 26a injects the anode gas. Thus, the anode gas passes through the ejector 29a and is then supplied to the FC 4a. The driving of the tank valve 24a, the regulating valve 25a, and the INJ 26a is controlled by the ECU 2. The same applies to the tank valve 24b, the regulating valve 25b, the INJ 26b, and the ejector 29b.

The INJs 26a and 26b supply the anode gas to the FCs 4a and 4b, respectively. The ejector 29a is connected to the return pipe 23a, and guides the anode gas discharged from the FC 4a to the FC 4a together with the anode gas supplied from the INJ 26a. The ejector 29b is connected to the return pipe 23b, and guides the anode gas discharged from the FC 4b to the FC 4b together with the anode gas supplied from the INJ 26b.

No pump for sending the anode gas discharged from the FCs 4a and 4b to the FCs 4a and 4b is disposed in the return pipes 23a and 23b. Instead of the pump, the anode gas is sent by the ejectors 29a and 29b. Thus, the device cost of the system 1 is reduced compared with that in a case where a pump is provided.

Additionally, an inlet pressure sensor 21ap that detects the pressure at the inlet of the anode gas flow path in the FC 4a (hereinafter, referred to as an inlet pressure) is disposed in the supply pipe 21a between the FC 4a and the ejector 29a. On the other hand, an inlet pressure sensor 21bp, which is the same as the inlet pressure sensor 21ap, is disposed in the supply pipe 21b.

The gas-liquid separator 27a and the discharge valve 28a are disposed in the discharge pipe 22a in this order from the upstream side. The gas-liquid separator 27a separates water from the anode gas discharged from the FC 4a and stores the water. The water stored in the gas-liquid separator 27a is discharged to the outside of the system 1 through the discharge pipe 22a by opening the discharge valve 28a. The driving of the discharge valve 28a is controlled by the ECU 2. The same applies to the gas-liquid separator 27b and the discharge valve 28b, but the discharge pipe 22b is connected to the middle of the discharge pipe 22a. That is, as the discharge valve 28b opens, water stored in the gas-liquid separator 27b is discharged to the outside of the system 1 through the discharge pipes 22b and 22a.

The return pipe 23a is a pipe for returning the anode gas discharged from the FC 4a to the FC 4a again. The upstream end of the return pipe 23a is connected to the gas-liquid separator 27a, and the downstream end of the return pipe 23a is connected to the ejector 29a. The ejector 29a uses the flow of the anode gas injected from the INJ 26a as driving flow to suck in the anode gas discharged from the FC 4a from the return pipe 23a and returns the anode gas discharged from the FC 4a to the FC 4a again. That is, the anode gas of the anode gas supply system 20a passes through the part located further downstream than the ejector 29a of the supply pipe 21a, the part located further upstream than the gas-liquid separator 27a of the discharge pipe 22a, and the return pipe 23a, and then returns to the FC 4a. In addition, the anode gas of the anode gas supply system 20b passes through the part located further downstream than the ejector 29b of the supply pipe 21b, the part located further upstream than the gas-liquid separator 27b of the discharge pipe 22b, and the return pipe 23b, and then returns to the FC 4b.

An outlet pressure sensor 23ap that detects the pressure at the outlet of the anode gas flow path in the FC 4a (hereinafter, referred to as an outlet pressure) is disposed in the return pipe 23a between the FC 4a and the gas-liquid separator 27a. On the other hand, an outlet pressure sensor 23bp, which is the same as the outlet pressure sensor 23ap, is disposed in the return pipe 23b.

The cooling systems 40a and 40b cool the FCs 4a and 4b heated through power generation, respectively. The cooling system 40a includes a cooling water supply pipe 41a, a cooling water discharge pipe 42a, a radiator 43a, a pump 44a, and a detour pipe 46a, while the cooling system 40b includes a cooling water supply pipe 41b, a cooling water discharge pipe 42b, a radiator 43b, a pump 44b, and a detour pipe 46b. In addition, the cooling systems 40a and 40b share communication pipes 47a and 47b. In this embodiment, cooling water is described as the coolant for cooling the FCs 4a and 4b, but this does not intend to suggest any limitation. Other coolant may be used.

The radiators 43a and 43b cool the cooling water of which the temperature has increased by absorbing heat of the FCs 4a and 4b by, for example, air-cooling, respectively. The cooled cooling water passes through the cooling water supply pipes 41a and 41b and is then supplied to the FCs 4a and 4b, respectively. The cooling water supply pipes 41a and 41b are connected to the inlets of the cooling water manifolds of the FCs 4a and 4b, respectively.

The radiator 43a includes a cooling temperature sensor 43ta that measures the temperature of the cooling water cooled by the radiator 43a, while the radiator 43b includes a cooling temperature sensor 43tb that measures the temperature of the cooling water cooled by the radiator 43b. The cooling temperature sensors 43ta and 43tb are examples of cooling temperature measuring devices that measure the temperature of the coolant.

The pump 44a for circulating the cooling water between the radiator 43a and the FC 4a is disposed in the cooling water supply pipe 41a. Similarly, the pump 44b for circulating the cooling water between the radiator 43b and the FC 4b is disposed in the cooling water supply pipe 41b.

The cooling water flows through the cooling water supply pipe 41a and the cooling water discharge pipe 42a to circulate between the radiator 43a and the FC 4a, while the cooling water flows through the cooling water supply pipe 41b and the cooling water discharge pipe 42b to circulate between the radiator 43b and the FC 4b.

The cooling water supply pipes 41a and 41b are examples of first and second coolant supply paths through which the cooling water flows from the radiators 43a and 43b to the FCs 4a and 4b, respectively. The cooling water discharge pipes 42a and 42b are examples of first and second coolant discharge paths through which the cooling water flows from the radiators 43a and 43b to the FCs 4a and 4b, respectively. The radiators 43a and 43b are examples of first and second cooling devices that cool the coolant that has cooled the FCs 4a and 4b.

A shut valve 61a is disposed in the cooling water supply pipe 41a between the FC 4a and the pump 44a, and a shut valve 61b is disposed in the cooling water supply pipe 41b between the FC 4b and the pump 44b. When the shut valves 61a and 61b are closed, the flow of cooling water to the FCs 4a and 4b is restricted. The shut valves 61a and 61b are examples of control valves that control a flow of the cooling water into the FCs 4a and 4b.

Cell temperature sensors 45a and 45b that measure the temperatures of the cooling water discharged from the FCs 4a and 4b respectively are disposed in the cooling water discharge pipes 42a and 42b, respectively. The cell temperature sensors 45a and 45b are examples of first and second cell temperature measuring devices that measure the temperatures Ta and Tb of the FCs 4a and 4b, respectively.

Circulation valves 62a and 62b are disposed in the cooling water discharge pipes 42a and 42b, respectively. The circulation valves 62a and 62b adjust the flow rates of the cooling water flowing through the radiators 43a and 43b in accordance with their open degrees, respectively.

The detour pipe 46a is connected between the cooling water discharge pipe 42a and the cooling water supply pipe 41a. The detour pipe 46b is connected between the cooling water discharge pipe 42b and the cooling water supply pipe 41b. First ends of the detour pipes 46a and 46b are connected to the cooling water supply pipes 41a and 41b on the upstream side of the pumps 44a and 44b, respectively. Second ends of the detour pipes 46a and 46b are connected to the cooling water discharge pipes 42a and 42b on the upstream side of the circulation valves 62a and 62b, respectively. The detour pipe 46a is connected between the cooling water discharge pipe 42a and the cooling water supply pipe 41a so as to bypass the radiator 43a, and the detour pipe 46b is connected between the cooling water discharge pipe 42b and the cooling water supply pipe 41b so as to bypass the radiator 43b. Each of the detour pipes 46a and 46b is an example of a first detour path.

Bypass valves 63a and 63b are disposed in the detour pipes 46a and 46b, respectively. The bypass valves 63a and 63b adjust the flow rates of the cooling water flowing from the cooling water discharge pipes 42a and 42b to the cooling water supply pipes 41a and 41b in accordance with their open degrees, respectively. The bypass valve 63a and the circulation valve 62a adjust the ratio of the flow rate of the cooling water flowing through the radiator 43a and the flow rate of the cooling water flowing through the detour pipe 46a in conjunction with each other. The bypass valve 63b and the circulation valve 62b adjust the ratio of the flow rate of the cooling water flowing through the radiator 43b and the flow rate of the cooling water flowing through the detour pipe 46b in conjunction with each other. The bypass valves 63a and 63b and the circulation valves 62a and 62b are examples of first adjusting devices that adjust the flow rates of the cooling water flowing through the detour pipes 46a and 46b, respectively. Instead of the bypass valves 63a and 63b and the circulation valves 62a and 62b, three-way valves may be disposed in the part where the cooling water discharge pipe 42a and the detour pipe 46a are connected and in the part where the cooling water discharge pipe 42b and the detour pipe 46b are connected.

The communication pipe 47a is connected between the cooling water discharge pipes 42a and 42b. A first end of the communication pipe 47a is connected to the cooling water discharge pipe 42a on the upstream side of the circulation valve 62a. A second end of the communication pipe 47a is connected to the cooling water discharge pipe 42b on the upstream side of the circulation valve 62b.

The communication pipe 47b is connected between the cooling water supply pipes 41a and 41b. A first end of the communication pipe 47b is connected to the cooling water supply pipe 41a on the upstream side of the shut valve 61a and the downstream side of the pump 44a. A second end of the communication pipe 47b is connected to the cooling water supply pipe 41b on the upstream side of the shut valve 61b and the downstream side of the pump 44b. The communication pipe 47b connects the cooling water supply pipes 41a and 41b to each other, while the communication pipe 47a connects the cooling water discharge pipes 42a and 42b to each other. The communication pipes 47a and 47b are examples of first and second connection paths.

Selector valves 60a and 60b are disposed in the communication pipes 47a and 47b, respectively. The selector valves 60a and 60b open and close the communication pipes 47a and 47b, respectively. The selector valves 60a and 60b are examples of first and second opening/closing valves disposed in the communication pipes 47a and 47b, respectively.

When the selector valve 60a is closed, the communication between the cooling water discharge pipes 42a and 42b is shut off. When the selector valve 60b is closed, the communication between the cooling water supply pipes 41a and 41b is shut off. When the selector valve 60a is opened, the cooling water discharge pipes 42a and 42b are communicated with each other through the communication pipe 47a. When the selector valve 60b is opened, the cooling water supply pipes 41a and 41b are communicated with each other through the communication pipe 47b. That is, opening the selector valve 60a causes the cooling water discharge pipes 42a and 42b to be communicated with each other, and opening the selector valve 60b causes the cooling water supply pipes 41a and 41b to be communicated with each other.

This forms a flow of the cooling water from one of the cooling water supply pipes 41a and 41b to the other of the cooling water supply pipes 41a and 41b, and a flow of the cooling water from one of the cooling water discharge pipes 42a and 42b to the other of the cooling water discharge pipes 42a and 42b. Thus, the cooling water circulates between the cooling water supply pipe 41a and the cooling water discharge pipe 42a, through which the cooling water for the FC 4a circulates, and the cooling water supply pipe 41b and the cooling water discharge pipe 42b, through which the cooling water for the FC 4b circulates. Unlike this example, the communication pipe 47b may connect the cooling water supply pipe 41a and the cooling water discharge pipe 42b to each other, and the communication pipe 47a may connect the cooling water supply pipe 41b and the cooling water discharge pipe 42a to each other. Also in this case, the cooling water circulates between the cooling water supply pipe 41a and the cooling water discharge pipe 42a and the cooling water supply pipe 41b and the cooling water discharge pipe 42b.

The electric power control system 30a includes a fuel cell DC/DC converter (hereinafter, referred to as an FDC) 32a, a battery DC/DC converter (hereinafter, referred to as a BDC) 34a, and an auxiliary inverter (hereinafter, referred to as an AINV) 39a, while the electric power control system 30b includes an FDC 32b, a BDC 34b, and an AINV 39b. The electric power control systems 30a and 30b share a motor inverter (hereinafter, referred to as an MINV) 38 connected to the motor 50. The FDCs 32a and 32b respectively adjust the direct-current (DC) power from the FCs 4a and 4b to output the adjusted DC power to the MINV 38. The BDCs 34a and 34b respectively adjust the DC power from the BATs 8a and 8b to output the adjusted DC power to the MINV 38. The electric power generated by the FCs 4a and 4b can be stored in the BATs 8a and 8b, respectively. The MINV 38 converts the input DC power to three-phase alternate-current (AC) power, and supplies the three-phase AC power to the motor 50. The motor 50 drives wheels 5 to cause the vehicle to run.

The electric power of the FC 4a and the BAT 8a can be supplied to a load device other than the motor 50 through the AINV 39a. Similarly, the electric power of the FC 4b and the BAT 8b can be supplied to a load device through the AINV 39b. Here, the load device includes auxiliary machines for the FCs 4a and 4b and auxiliary machines for the vehicle. The auxiliary machines for the FCs 4a and 4b include the air compressors 14a and 14b, the bypass valves 15a and 15b, the back pressure valves 17a and 17b, the tank valves 24a and 24b, the regulating valves 25a and 25b, the INJs 26a and 26b, the discharge valves 28a and 28b, the selector valves 60a and 60b, the shut valves 61a and 61b, the circulation valves 62a and 62b, and the bypass valves 63a and 63b. The auxiliary machines for the vehicle include, for example, an air conditioner unit, a lighting system, hazard lights, and the like.

The ECU 2 includes a central processing unit (CPU), a read only memory (ROM), and a random access memory (RAM). Electrically connected to the ECU 2 are an accelerator opening sensor 6, the air compressors 14a and 14b, the bypass valves 15a and 15b, the back pressure valves 17a and 17b, the tank valves 24a and 24b, the regulating valves 25a and 25b, the INJs 26a and 26b, the discharge valves 28a and 28b, the selector valves 60a and 60b, the shut valves 61a and 61b, the circulation valves 62a and 62b, the bypass valves 63a and 63b, the FDCs 32a and 32b, the BDCs 34a and 34b, the cell temperature sensors 45a and 45b, the inlet pressure sensors 21ap and 21bp, and the outlet pressure sensors 23ap and 23bp. The ECU 2 calculates the output current values required of the FCs 4a and 4b (hereinafter, referred to as require current values) based on the detection value of the accelerator opening sensor 6. In addition, the ECU 2 controls the auxiliary machines for the FCs 4a and 4b in accordance with the required current value to control the total electric power generated by the FCs 4a and 4b.

In addition, the ECU 2 determines whether there is a possibility of occurrence of flooding in the FCs 4a and 4b due to the power generation of the FCs 4a and 4b. When determining that there is a possibility of occurrence of flooding in the OFCs 4a and 4b, the ECU 2 suspends the power generation of the FC 4a, controls the circulation valve 62a and the bypass valve 63a, or the radiator 43a such that the temperature of the coolant for cooling the FC 4a increases, and opens the selector valves 60a and 60b. Since the ECU 2 suspends the power generation of the FC 4a, production of liquid water in the FC 4a is inhibited, and occurrence of flooding is thereby inhibited.

In addition, the ECU 2 controls the circulation valve 62a and the bypass valve 63a, or the radiator 43a such that the temperature of the cooling water for cooling the FC 4a increases, and opens the selector valves 60a and 60b. Thus, high-temperature cooling water flows from the cooling system 40a including the cooling water supply pipe 41a and the cooling water discharge pipe 42a into the cooling system 40b including the cooling water supply pipe 41b and the cooling water discharge pipe 42b. Thus, excessive cooling of the FC 4b is inhibited, and occurrence of flooding in the FC 4b is thereby inhibited.

In addition, as the selector valves 60a and 60b open, the flow rate of the cooling water flowing into the FC 4b increases. Thus, the heat capacity of the cooling water increases. Hence, increase in the temperature of the unit cell near the outlet of the cooling water of the FC 4b is inhibited. Therefore, overheating of the FCs 4a and 4b and flooding in the FCs 4a and 4b are inhibited. When determining that there is a possibility of occurrence of flooding in the FCs 4a and 4b, the ECU 2 may suspend the power generation of the FC 4b instead of the FC 4a. In this case, the ECU 2 controls the circulation valve 62b and the bypass valve 63b, or the radiator 43b such that the temperature of the cooling water for cooling the FC 4b increases, and opens the selector valves 60a and 60b.

The ECU 2 is an example of a controller that controls the FCs 4a and 4b, the radiators 43a and 43b, the circulation valves 62a and 62b, the bypass valves 63a and 63b, and the selector valves 60a and 60b. The ECU 2 may be separately provided for each of the FCs 4a and 4b, and a configuration in which three or more ECUs 2 are connected so as to communicate with each other may be employed.

[Example of Power Generation Control]

Figure 2:
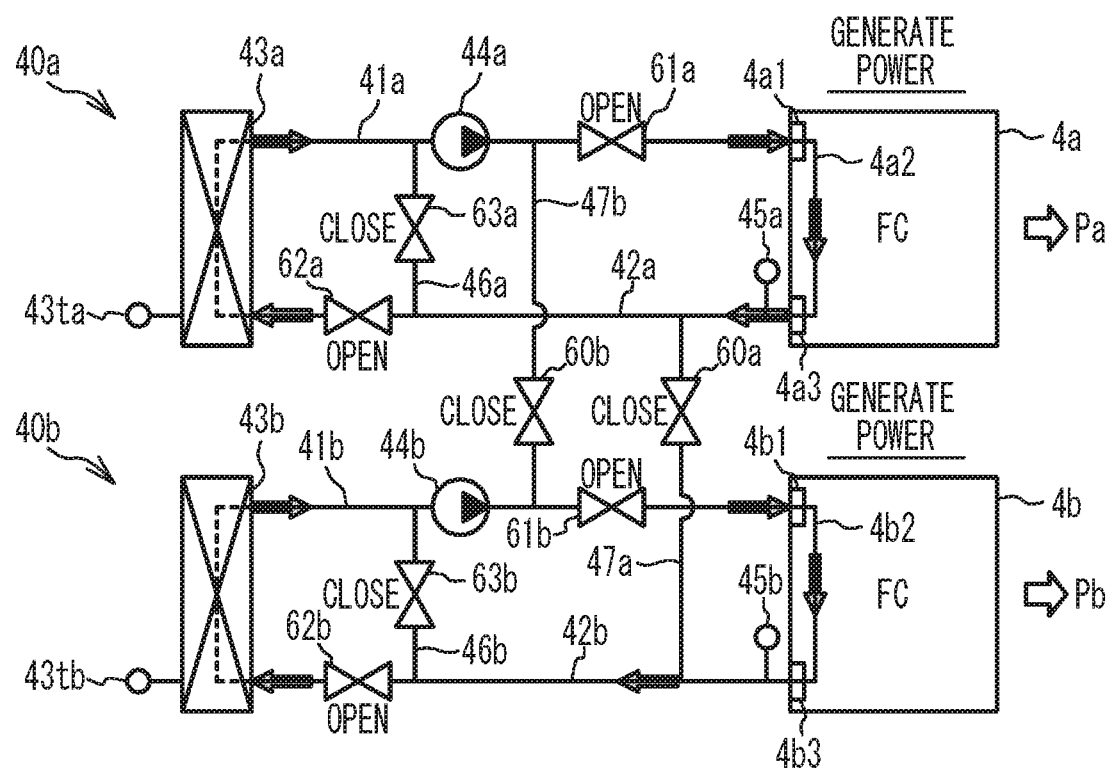
FIG. 2 illustrates a flow of cooling water when both fuel cells are generating electric power.

FIG. 2 illustrates a flow of the cooling water while both the FCs 4a and 4b are generating electric power. In FIG. 2, the same reference numerals are provided to components in common with those illustrated in FIG. 1, and the description thereof is omitted. Arrows illustrated on the cooling water supply pipes 41a and 41b, the cooling water discharge pipes 42a and 42b, and cooling water paths 4a2 and 4b2 in FIG. 2 indicate the direction in which the cooling water flows. The cooling water path 4a2 is a flow path of the cooling water, and connects an inlet 4a1 and an outlet 4a3 of the cooling water in the FC 4a, while the cooling water path 4b2 is a flow path of the cooling water, and connects an inlet 4b1 and an outlet 4b3 of the cooling water in the FC 4b.

When both the FCs 4a and 4b are generating electric power, the selector valves 60a and 60b are closed. Thus, no cooling water flows between the cooling water supply pipe 41a of the cooling system 40a and the cooling water supply pipe 41b of the cooling system 40b and between the cooling water discharge pipe 42a of the cooling system 40a and the cooling water discharge pipe 42b of the cooling system 40b. In addition, since the bypass valves 63a and 63b are closed, no cooling water passes through the detour pipes 46a and 46b to bypass the radiators 43a and 43b.

The cooling water are pumped by the pumps 44a and 44b and thereby circulated between the cooling water supply pipe 41a and the cooling water discharge pipe 42a and between the cooling water supply pipe 41b and the cooling water discharge pipe 42b. Since the shut valves 61a and 61b are opened, the cooling water that has been cooled by the radiators 43a and 43b flow through the cooling water supply pipes 41a and 41b into the inlets 4a1 and 4b1 of the FCs 4a and 4b, respectively.

The cooling water flows through the cooling water paths 4a2 and 4b2 in the FCs 4a and 4b, cools the FCs 4a and 4b, and is discharged from the outlets 4a3 and 4b3 to the cooling water discharge pipes 42a and 42b, respectively. The cooling water paths 4a2 and 4b2 include a manifold and a groove flow-path included in a separator of each unit cell included in the FCs 4a and 4b, respectively. Since the circulation valves 62a and 62b are opened, the cooling water flows through the cooling water discharge pipes 42a and 42b into the radiators 43a and 43b. The cooling water is cooled by the radiators 43a and 43b, respectively.

Since the selector valves 60a and 60b are closed, no cooling water flows between the cooling systems 40a and 40b.

As described above, the cooling water flows through the cooling water supply pipe 41a and the cooling water discharge pipe 42a between the FC 4a and the radiator 43a, and flows through the cooling water supply pipe 41b and the cooling water discharge pipe 42b between the FC 4b and the radiator 43b. Thus, the FCs 4a and 4b of which the temperature has increased due to the power generation are cooled. The electric power generated by the FC 4a is represented by Pa, while the electric power generated by the FC 4b is represented by Pb. The state where both the FCs 4a and 4b generate electric power as described above is described hereinafter as a "steady power generation state".

When determining that there is a possibility of occurrence of flooding in the FCs 4a and 4b due to the power generation of the FCs 4a and 4b in the steady power generation state, the ECU 2 suspends the power generation of one of the FCs 4a and 4b, and increases the electric power generated by the other of the FCs 4a and 4b. In this case, the ECU 2 keeps the selector valves 60a and 60b closed such that no cooling water flows between the cooling systems 40a and 40b. This state will be described hereinafter as a "first single-unit power generation state".

Figure 3A:
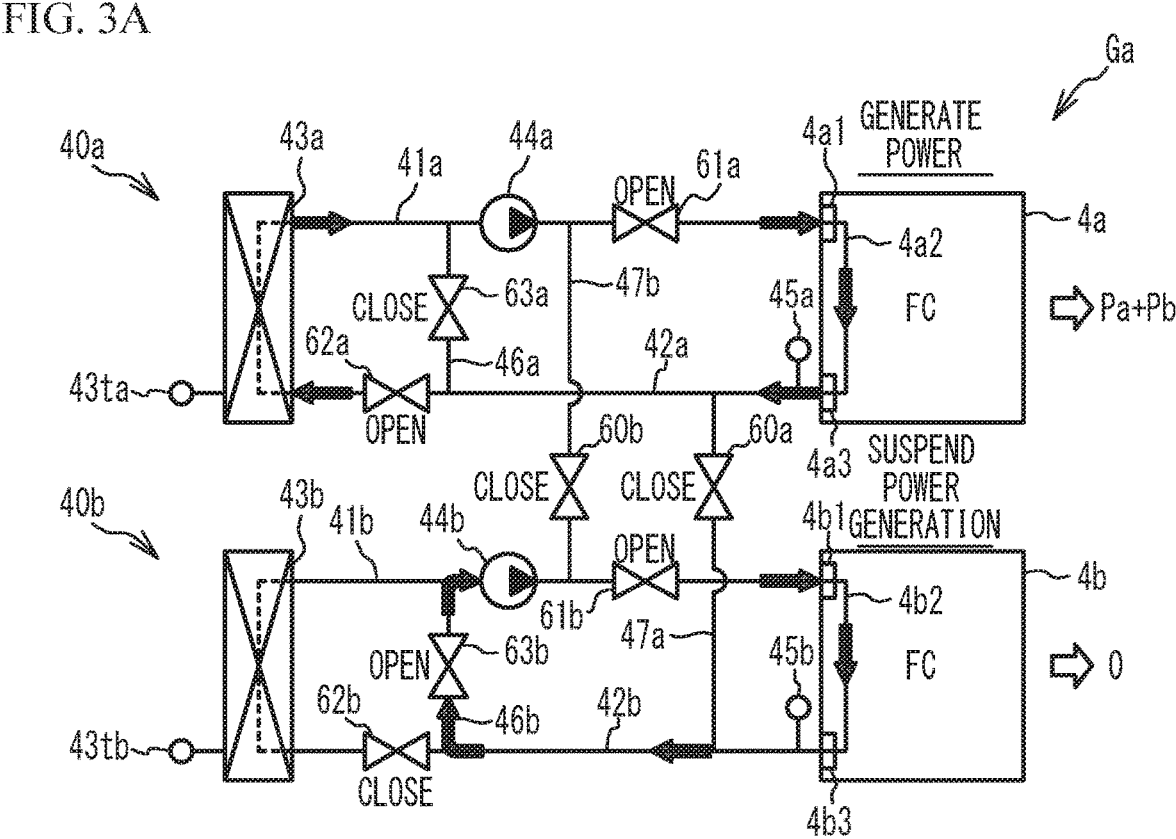
FIG. 3A and FIG. 3B illustrate a flow of cooling water in a first single-unit power generation state.
Figure 3B:
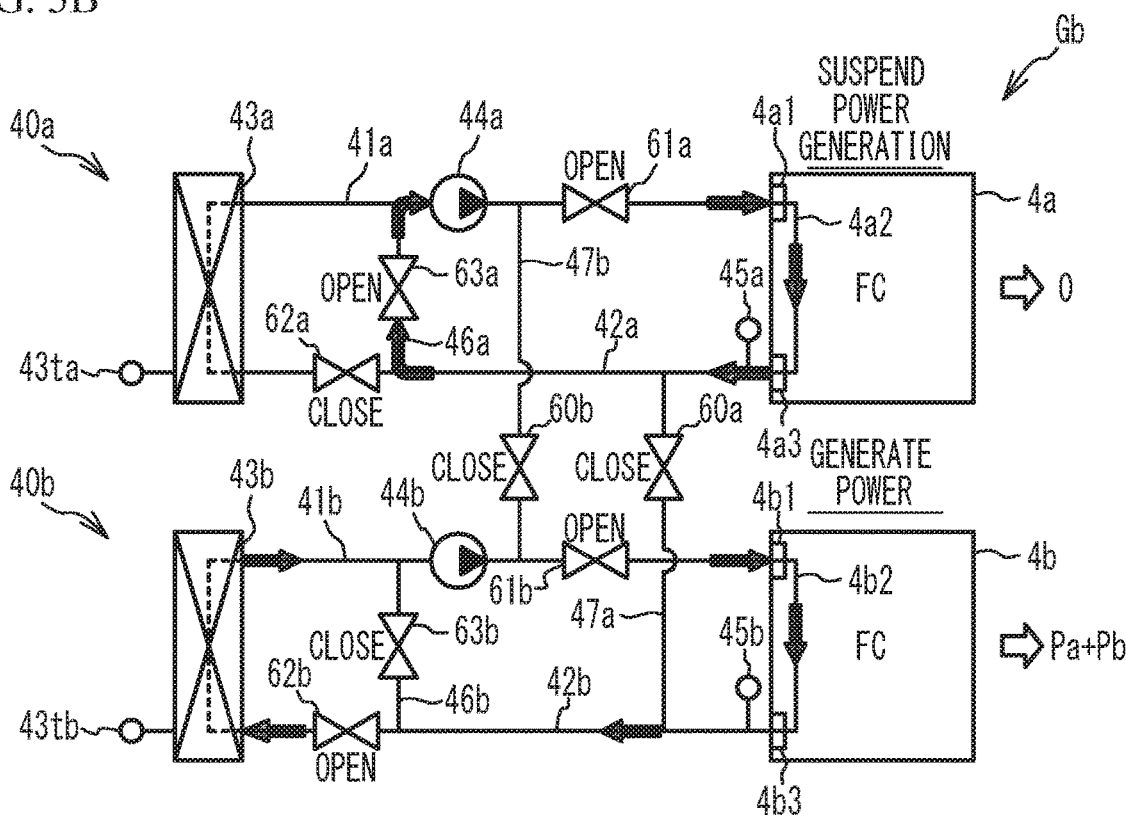

FIG. 3A and FIG. 3B illustrate a flow of the cooling water in the first single-unit power generation state. In FIG. 3A and FIG. 3B, the same reference numerals are provided to the components in common with those illustrated in FIG. 1, and the description thereof is omitted.

Since liquid water is not produced in one of the FCs 4a and 4b because of suspension of the power generation, occurrence of flooding is inhibited. In addition, since the electric power generated by the other of the FCs 4a and 4b increases, the supply amount of the anode gas increases. Thus, liquid water in the flow path of the anode gas is discharged by the flow of the anode gas, and occurrence of flooding is thereby inhibited.

The reference character Ga indicates the flow of the cooling water when the power generation of the FC 4b is suspended. In this case, the ECU 2 closes the circulation valve 62b of the FC 4b of which the power generation is suspended and opens the bypass valve 63b. Thus, after discharged from the FC 4b, the cooling water bypasses the radiator 43b, and flows through the detour pipe 46b into the cooling water supply pipe 41b. That is, the cooling water does not flow into the radiator 43b.

Thus, the cooling water of the cooling system 40b is not cooled by the radiator 43b, and absorbs the remaining heat of the FC 4b. Therefore, the temperature of the cooling water increases.

In addition, the flow of the cooling water of the cooling system 40a is the same as that in the steady power generation state. Specifically, since the circulation valve 62a and the shut valve 61a are opened and the bypass valve 63a is closed, the cooling water circulates between the FC 4a and the radiator 43a through the cooling water supply pipe 41a and the cooling water discharge pipe 42a. In addition, since the selector valves 60a and 60b are closed, no cooling water flows between the cooling systems 40a and 40b.

In addition, the ECU 2 increases the electric power generated by the FC 4a in accordance with the decline in generated electric power due to the suspension of the power generation of the FC 4b. For example, the ECU 2 causes the FC 4a to additionally generate the electric power generated in the steady power generation state by the FC 4b by increasing the supply amount of the fuel gas to the FC 4a. Accordingly, the electric power generated by the FC 4a becomes (Pa+Pb). The electric power generated by the FC 4b of which the power generation has been suspended becomes zero. Through the above process, the electric power generated in the steady power generation state is maintained.

The reference character Gb indicates the flow of the cooling water when the power generation of the FC 4a is suspended. The ECU 2 closes the circulation valve 62a of the FC 4a of which the power generation is suspended, and opens the bypass valve 63a. In addition, the selector valves 60a and 60b are closed. The ECU 2 increases the electric power generated by the FC 4b in accordance with the decline in generated electric power due to the suspension of the power generation of the FC 4a. Thus, the operation in which the configurations at the FC 4a side and the configurations at the FC 4b side in the operation indicated by the reference character Ga and described above are interchanged is performed.

When determining that there is a possibility of occurrence of flooding in the FC 4a or 4b due to the power generation of the FC 4a or 4b in the first single-unit power generation state, the ECU 2 opens the selector valves 60a and 60b such that the cooling water flows between the cooling systems 40a and 40b. This state will be described hereinafter as a "second single-unit power generation state".

Figure 4A:
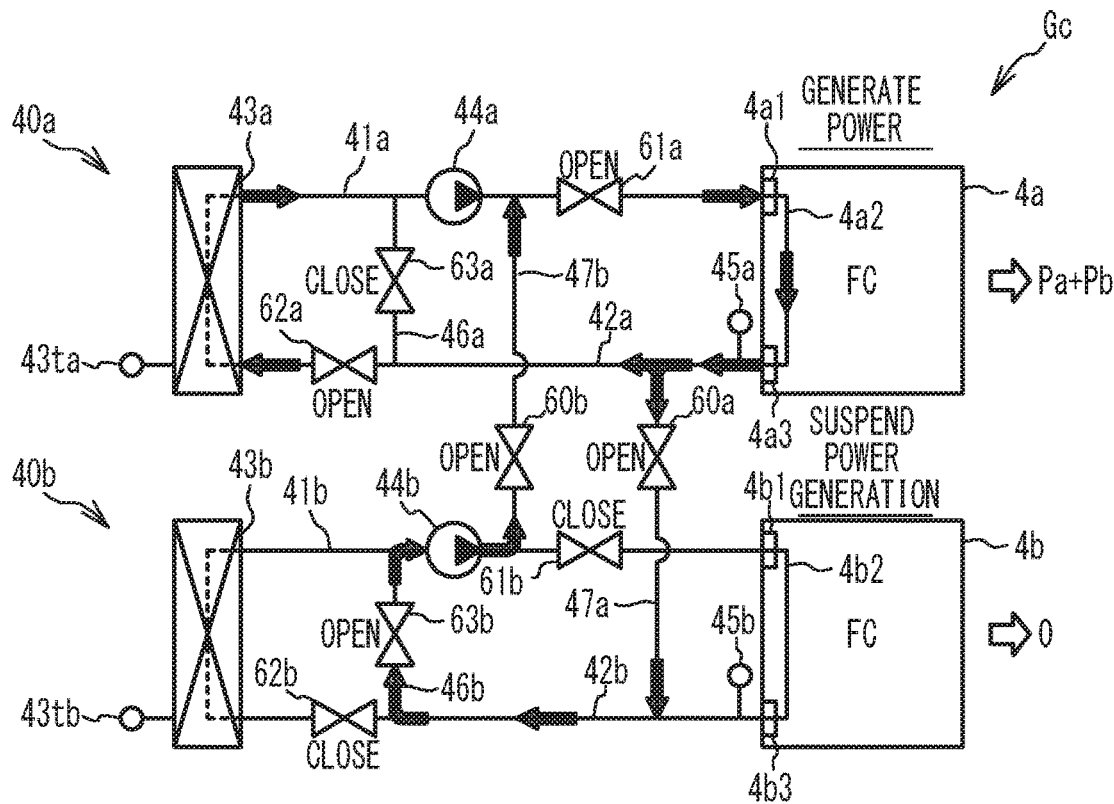
FIG. 4A and FIG. 4B illustrate a flow of cooling water in a second single-unit power generation state.
Figure 4B:
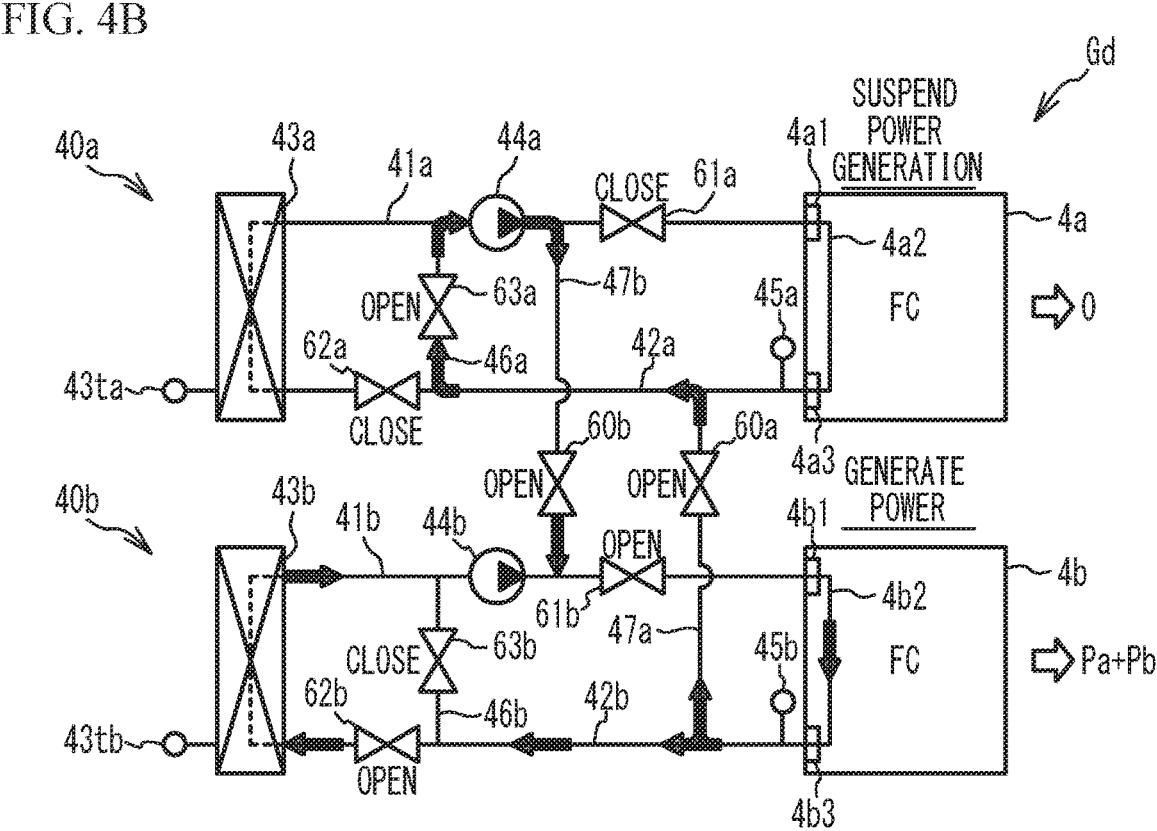

FIG. 4A and FIG. 4B illustrate a flow of the cooling water in the second single-unit power generation state. In FIG. 4A and FIG. 4B, the same reference numerals are provided to the components in common with those illustrated in FIG. 1, and the description thereof is omitted.

When suspending the power generation of one of the FCs 4a and 4b, the ECU 2 determines whether there is a possibility of occurrence of flooding in the other of the FCs 4a and 4b due to the power generation of the other of the FCs 4a and 4b. When there is a possibility of occurrence of flooding in the other of the FCs 4a and 4b, the ECU 2 opens the selector valves 60a and 60b.

This causes high-temperature cooling water to flow from the one of the cooling systems 40a and 40b into the other of the cooling systems 40a and 40b. Thus, the other of the FCs 4a and 4b is inhibited from being excessively cooled. Thus, decrease in the amount of saturated water vapor in the other of the FCs 4a and 4b is reduced, and production of liquid water is thereby inhibited. Therefore, occurrence of flooding is inhibited.

The reference character Gc indicates the flow of the cooling water in the second single-unit power generation state corresponding to the case indicated by the reference character Ga. The ECU 2 opens the selector valves 60a and 60b, and closes the shut valve 61b. This causes the cooling water to circulate between the cooling systems 40a and 40b.

The cooling water of the cooling water supply pipe 41b flows through the communication pipe 47b into the cooling water supply pipe 41a by driving of the pump 44b. In this case, since the shut valve 61b is closed, no cooling water flows through the FC 4b. Thus, the flow rate of the cooling water of the communication pipe 47b becomes greater than that in the case where the shut valve 61b is opened. When the flow rate of the cooling water is restricted, the shut valve 61b may be kept opened.

The cooling water of the cooling system 40a of the FC 4a that is generating electric power increases in temperature because of inflow of high-temperature cooling water from the cooling system 40b of the FC 4b of which the power generation is suspended. The cooling water flows through the cooling water path 4a2 from the inlet 4a1 of the FC 4a and is discharged from the outlet 4a3 to the cooling water discharge pipe 42a. Part of the cooling water flowing through the cooling water discharge pipe 42a flows into the radiator 43a, while the remaining of the cooling water flows through the communication pipe 47a into the cooling water discharge pipe 42b of the cooling system 40b. Since the circulation valve 62b is closed and the bypass valve 63b is opened, the cooling water flows through the detour pipe 46b from the cooling water discharge pipe 42b into the cooling water supply pipe 41b.

As described above, by opening the selector valves 60a and 60b, the cooling water circulates between the cooling systems 40a and 40b. The temperature of the cooling water of the cooling system 40b of the FC 4b of which the power generation is suspended is increased because the circulation to the radiator 43b is stopped in the first single-unit power generation state. Thus, excessive cooling of the FC 4a that is generating electric power is inhibited.

In addition, the flow rate of the cooling water in the cooling system 40a of the FC 4a during the power generation becomes greater than those in the steady power generation state and the first single-unit power generation state because the cooling water of the other cooling system 40b is added. Thus, the flow rate of the cooling water flowing into the FC 4a increases, and the heat capacity of the cooling water thereby increases. Therefore, the temperature increase of the unit cell near the outlet 4a3 of the cooling water of the FC 4a is inhibited.

The reference character Gd indicates a flow of the cooling water in the second single-unit power generation state corresponding to the case indicated by the reference character Gb. The ECU 2 opens the selector valves 60a and 60b and closes the shut valve 61a. This causes the cooling water to circulate between the cooling systems 40a and 40b. Thus, performed is the operation in which the configurations at the FC 4a side and the configurations at the FC 4b side in the operation indicated by the reference character Gc and described above are interchanged.

As described above, after suspending the power generation of one of the FCs 4a and 4b, the ECU 2 determines whether there is a possibility of occurrence of flooding in the other of the FCs 4a and 4b due to the power generation of the other of the FCs 4a and 4b. When there is a possibility of occurrence of flooding in the other of the FCs 4a and 4b, the ECU 2 opens the selector valves 60a and 60b.

Thus, when there is no possibility of occurrence of flooding due to the power generation of only the other of the FCs 4a and 4b, the ECU 2 keeps the selector valves 60a and 60b closed. Therefore, in the first single-unit power generation state, when there is no possibility of occurrence of flooding in the FC that is generating electric power of the FCs 4a and 4b, the increase in the temperature of the cooling water is inhibited.

[Procedure to Return to the Steady Power Generation State]

Next, a description will be given of a procedure to return to the steady power generation state illustrated in FIG. 2 from the second single-unit power generation state indicated by the reference character Gd. The ECU 2 causes the cooling water to preliminarily flow through the radiator 43a to sufficiently decrease the temperature of the cooling water such that the power generation performance of the FC 4a is not affected by the rapid flow of the high-temperature cooling water into the FC 4a of which the power generation is suspended.

Figure 5A:
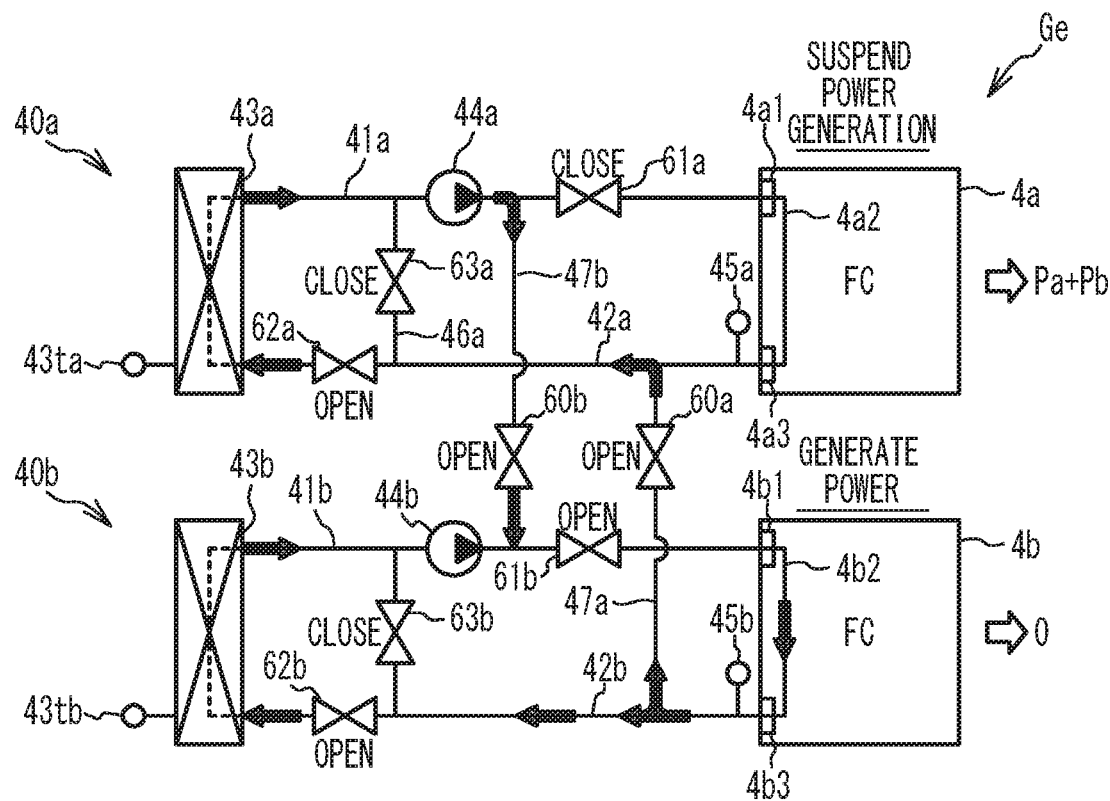
FIG. 5A and FIG. 5B illustrate an exemplary procedure to return to a steady power generation state from the second single-unit power generation state.
Figure 5B:
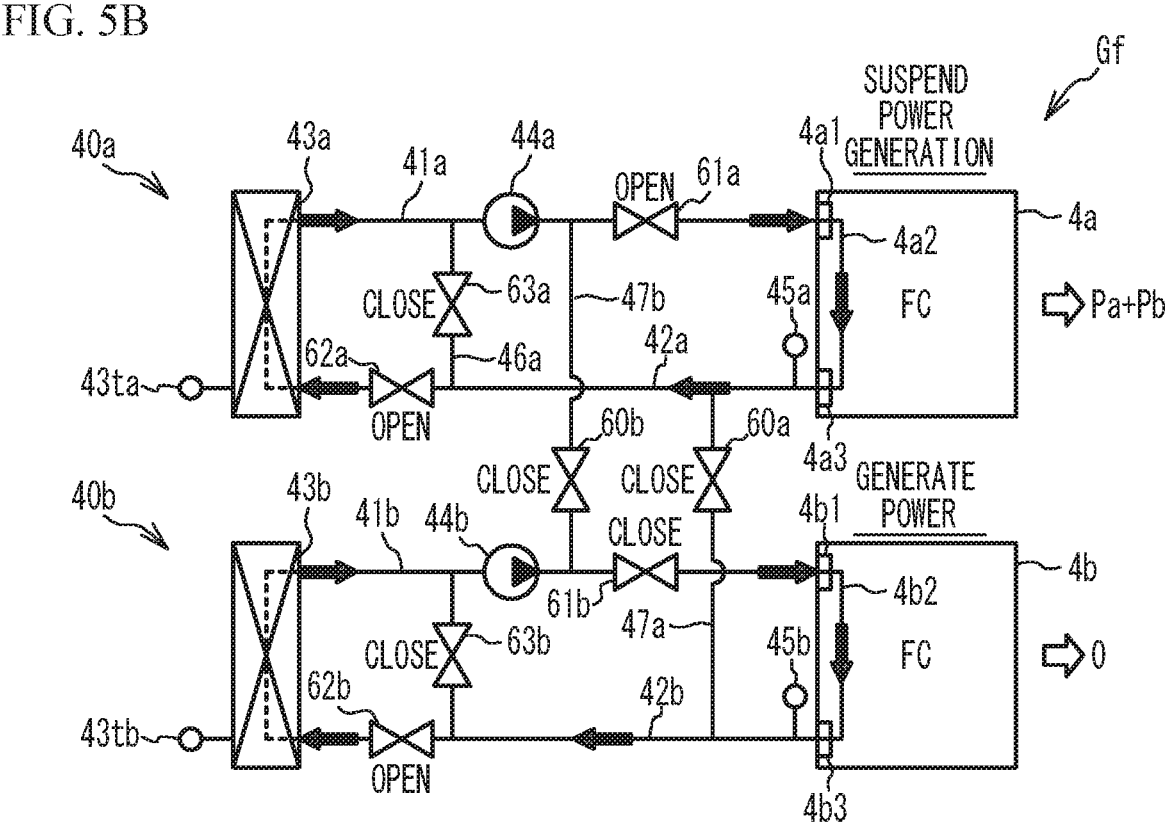

FIG. 5A and FIG. 5B illustrate an exemplary procedure to return to the steady power generation state from the second single-unit power generation state. In FIG. 5A and FIG. 5B, the same reference numerals are provided to the components in common with those illustrated in FIG. 1, and the description thereof is omitted.

When determining that there is no possibility of occurrence of flooding in the FCs 4a and 4b due to the power generation of the FC 4b in the second single-unit power generation state, the ECU 2 opens the circulation valve 62a, and closes the bypass valve 63a as indicated by the reference character Ge. This causes the cooling water to flow through the cooling water discharge pipe 42a and start to flow through the radiator 43a. The cooling water is cooled by the radiator 43a and flows through the cooling water supply pipe 41a.

Thus, the cooling water is cooled by the radiator 43a. The ECU 2 observes the temperature of the cooling temperature sensor 43ta (hereinafter, referred to as a cooling temperature).

When the cooling temperature becomes lower than a threshold value K, the ECU 2 closes the selector valves 60a and 60b and opens the shut valve 61a as indicated by the reference character Gf. Here, the threshold value K is the maximum value of the temperature at which the FC 4a can sufficiently deliver the power generation performance. Thus, the ECU 2 can cause the cooling water of which the temperature is decreased to a sufficiently low temperature to flow through the FC 4a of which the power generation is suspended.

Thereafter, the ECU 2 resumes the power generation of the FC 4a. In this case, for example, the ECU 2 increases the supply amount of the anode gas to the FC 4a. This causes the states of the FCs 4a and 4b to return to the steady power generation state.

As described above, after opening the circulation valve 62a and closing the bypass valve 63a such that the temperature of the cooling water of the FC 4a decreases, the ECU 2 closes the selector valves 60a and 60b and opens the shut valve 61a to resume the power generation of the FC 4a. Thus, after high-temperature cooling water is sufficiently cooled by the radiator 43a, the cooled cooling water is supplied to the FC 4a. Therefore, when the power generation of the FC 4a is resumed, the power generation performance of the FC 4a is inhibited from being affected by the high-temperature cooling water.

In addition, when the cooling temperature becomes lower than the threshold value K after the circulation valve 62a is opened and the bypass valve 63a is closed, the ECU 2 closes the selector valves 60a and 60b and opens the shut valve 61a. Thus, the influence to the power generation performance of the FC 4a is more securely reduced compared with that in the case where the cooling temperature is not used.

[Process of the ECU 2]

Next, a description will be given of a process of the ECU 2 that controls the states of the FCs 4a and 4b.

Figure 6:
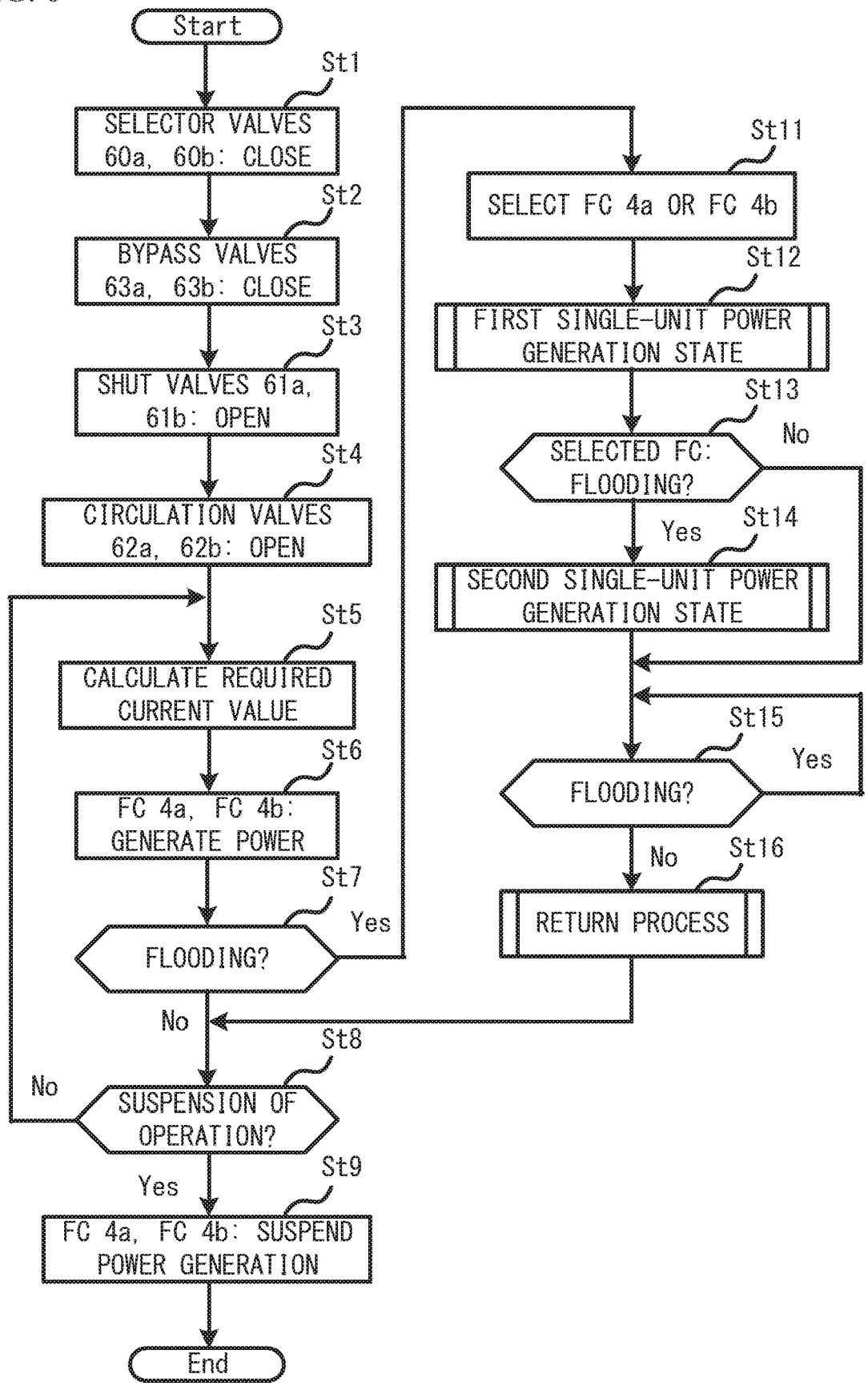
FIG. 6 is a flowchart of an exemplary process executed by an electronic control unit (ECU)

FIG. 6 is a flowchart of an exemplary process of the ECU 2. This process is executed when the ignition switch (not illustrated) for starting the vehicle is turned from off to on, for example. Each step illustrated in the flowchart is executed by the functions of the software executed by the CPU of the ECU 2, but this does not intend to suggest any limitation. The steps may be implemented by the functions of the hardware device such as an integrated circuit (IC). It is assumed that prior to this process, the auxiliary machines such as the air compressors 14a and 14b and the radiators 43a and 43b are already activated.

The ECU 2 closes the selector valves 60a and 60b (step St1). Thus, the cooling water stops flowing between the cooling systems 40a and 40b.

Then, the ECU 2 closes the bypass valves 63a and 63b (step St2). Thus, no cooling water flows through the detour pipes 46a and 46b.

Then, the ECU 2 opens the shut valves 61a and 61b (step St3). Thus, the cooling water flows through the FCs 4a and 4b.

Then, the ECU 2 opens the circulation valves 62a and 62b (step St4). Thus, the cooling water flows through the radiators 43a and 43b.

Then, the ECU 2 calculates the required current value Irq when the FCs 4a and 4b generate electric power based on, for example, the detection value of the accelerator opening sensor 6 (step St5). The ECU 2 sets the require current values Irq of the FCs 4a and 4b at the same value, for example, but may set the require current values Irq of the FCs 4a and 4b at different values.

Then, the ECU 2 causes the FCs 4a and 4b to generate electric power according to the require current values Irq (step St6). In this case, the ECU 2 controls the injection quantities of the INJs 26a and 26b and the output of the air compressors 14a and 14b such that the supply amounts of the anode gas and the cathode gas are the amounts corresponding to the required current values Irq. This causes the system 1 to be in the steady power generation state.

Then, the ECU 2 determines whether there is a possibility of occurrence of flooding (hereinafter, referred to as a possibility of flooding) due to the power generation of the FCs 4a and 4b (step St7). One method of determining whether there is a possibility of flooding is comparing the required current value Irq with a threshold value, for example. When there is no possibility of flooding (step St7/No), the ECU 2 determines whether suspension of the operation of the FCs 4a and 4b is instructed (step St8). In this case, the ECU 2 determines that suspension of the operation is instructed when the ignition switch is turned off, for example.

When suspension of operation is instructed (step St8/Yes), the ECU 2 suspends the power generation of the FCs 4a and 4b (step St9). In this case, the ECU 2 stops the injection of the INJs 26a and 26b and the output of the air compressors 14a and 14b such that the supply of the anode gas and the cathode gas is stopped.

When there is a possibility of flooding (step St7/Yes), the ECU 2 selects, from the FCs 4a and 4b, the FC that is to continue the power generation in the first single-unit power generation state (step St11), and executes a control process for causing the system 1 to transition to the first single-unit power generation state to execute a process for inhibiting flooding (step St12). This control process for transition will be described later.

In step St11, the ECU 2 may compare the accumulated power generation time of the FC 4a and the accumulated power generation time of the FC 4b, and select one of the FCs 4a and 4b of which the accumulated power generation time is longer as the FC of which the power generation is to be suspended. In this case, the ECU 2 records the information on the accumulated power generation time in a memory, and compares the accumulated power generation times based on the recorded information. This configuration allows the ECU 2 to inhibit the age deterioration of the FC of which the accumulated power generation time is longer of the FCs 4a and 4b.

Then, the ECU 2 determines whether there is a possibility of occurrence of flooding in the FC 4a, 4b due to the power generation of the FC 4a or the FC 4b selected in step St11 (step St13). When there is a possibility of flooding (step St13/Yes), the ECU 2 executes a control process for causing the system 1 to transition to the second single-unit power generation state to execute a process for further inhibiting flooding (step St14). This control process for transition will be described later. When there is no possibility of flooding (step St13/No), the control process for transition is not executed.

Then, the ECU 2 determines whether there is a possibility of flooding due to the power generation of the FCs 4a and 4b to determine whether it is possible to return the state of the system 1 to the steady power generation state (step St15). When there is a possibility of flooding (step St15/Yes), the determination is executed again (step St15).

When there is no possibility of flooding (step St15/No), the ECU 2 executes a process for returning the state of the system 1 to the steady power generation state (hereinafter, referred to as a return process) (step St16). Thereafter, each step in and after step St8 is executed. The ECU 2 executes the process as described above.

Figure 7:
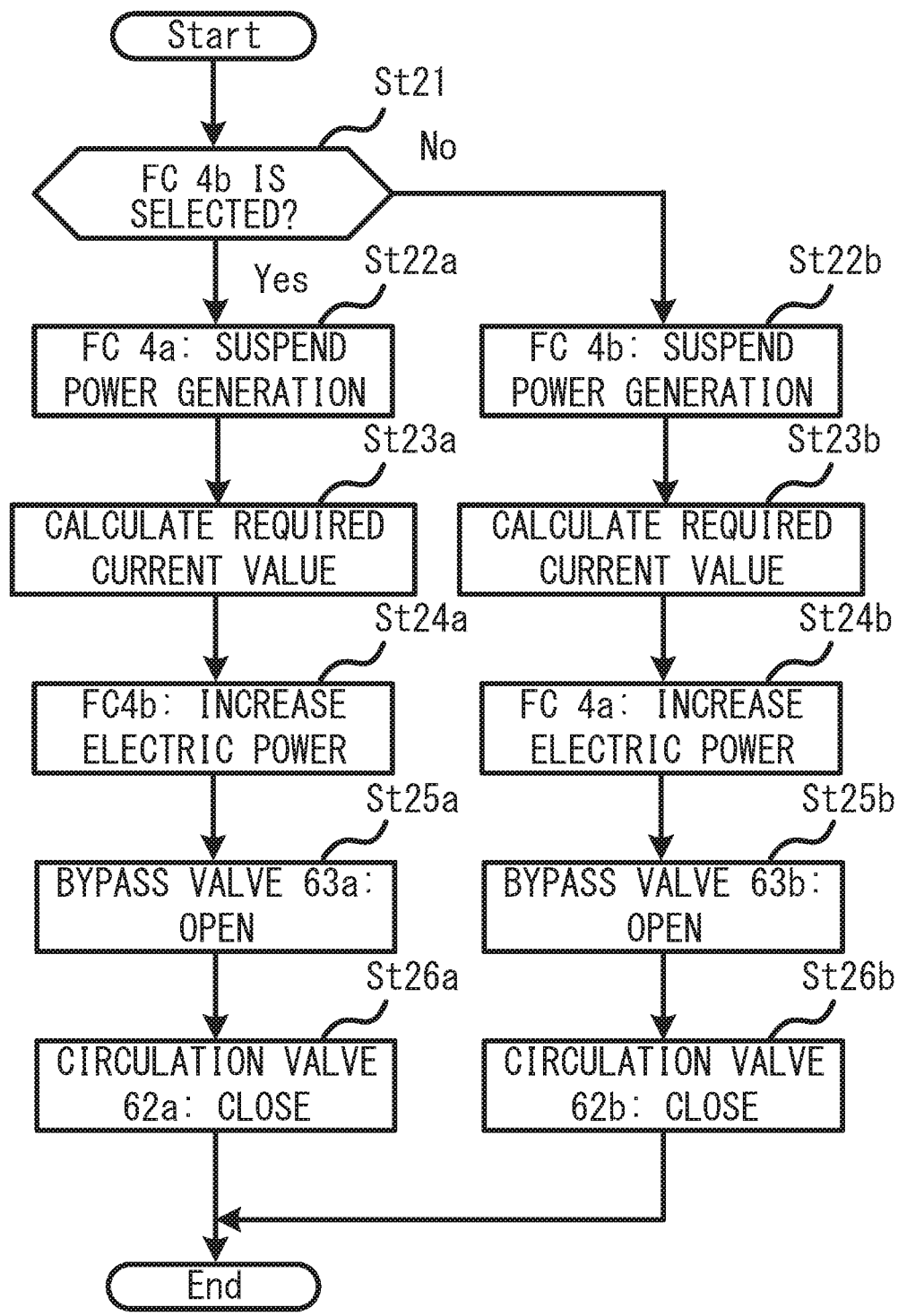
FIG. 7 is a flowchart of an exemplary control process to transition to the first single-unit power generation state.

FIG. 7 is a flowchart of an exemplary control process for transition to the first single-unit power generation state. This process is executed in step St12 described above.

The ECU 2 determines which of the FCs 4a and 4b has been selected in step St11 (step St21). When the FC 4b is selected (step St21/Yes), the ECU 2 executes the following steps St22a to St26a.

The ECU 2 suspends the power generation of the FC 4a (step St22a). Thus, the production of liquid water by the power generation of the FC 4a is inhibited, and flooding in the FC 4a is thereby inhibited.

In this case, the ECU 2 suspends the power generation of the FC 4a by reducing the output of at least one of the air compressor 14a and the INJ 26a or stopping at least one of the air compressor 14a and the INJ 26a. That is, the ECU 2 reduces at least one of the supply amount of the cathode gas from the air compressor 14a and the supply amount of the anode gas from the INJ 26a. The ECU 2 may suspend the power generation of the FC 4a by controlling the switch element of the FDC 32a such that the connection between the FC 4a and the electric load is disconnected, instead of controlling of the air compressor 14a and the INJ 26a.

Then, the ECU 2 calculates the required current value Irq_b of the FC 4b when only the FC 4b generates electric power based on, for example, the detection value of the accelerator opening sensor 6 (step St23a). Then, the ECU 2 increases the electric power generated by the FC 4b according to the required current value Irq_b (step St24a). In this case, the ECU 2 increases the electric power generated by the FC 4b by, for example, increasing the output of at least one of the air compressor 14b and the INJ 26b. That is, the ECU 2 increases at least one of the supply amount of the cathode gas from the air compressor 14a and the supply amount of the anode gas from the INJ 26a.

Accordingly, the ECU 2 increases the electric power generated by the FC 4b according to the decline in generated electric power due to the suspension of the power generation of the FC 4a. Thus, the decline in generated electric power is compensated for by the electric power generated by the FC 4b. Therefore, the electric power that has been generated in the steady power generation state is maintained. Additionally, liquid water is easily discharged from the FC 4a due to the increase in the flow rates of the anode gas and the cathode gas, and flooding in the FC 4a is thereby inhibited.

Next, the ECU 2 opens the bypass valve 63a (step St25a), and closes the circulation valve 62a (step St26a). This causes the system 1 to transition to the first single-unit power generation state indicated by the reference character Gb in FIG. 3B. In this case, the cooling water of the cooling system 40a flows through the detour pipe 46a so as to bypass the radiator 43a, therefore increasing in temperature. That is, the ECU 2 controls the bypass valve 63a and the circulation valve 62a such that the temperature of the coolant for cooling the FC 4a increases. In this case, since the power generation of the FC 4a is suspended, even when the cooling water increases in temperature, the FC 4*a* is not affected. The control process for transition to the first single-unit power generation state when the power generation of the FC 4*a* is suspended is executed as described above.

When the FC 4*a* is selected (step St21/No), the ECU 2 executes the following steps St22*b* to St26*b*. The operation in this case is the operation in which the FCs 4*a* and 4*b* in the operation when the FC 4*a* is selected as the fuel cell of which the power generation is to be suspended described above are interchanged. Thus, the description thereof is simplified.

The ECU 2 suspends the power generation of the FC 4*b* (step St22*b*). Then, the ECU 2 calculates the required current value Irq_a of the FC 4*a* when only the FC 4*a* generates electric power based on the detection value of the accelerator opening sensor 6 (step St23*b*). Then, the ECU 2 increases the electric power generated by the FC 4*a* according to the required current value Irq_a (step St24*b*).

Then, the ECU 2 opens the bypass valve 63*b* (step St25*b*), and closes the circulation valve 62*b* (step St26*b*). This causes the state of the system 1 to transition to the first single-unit power generation state indicated by the reference character Ga in FIG. 3A. In this case, the cooling water of the cooling system 40*b* flows through the detour pipe 46*b* so as to bypass the radiator 43*b*, thereby increasing in temperature. That is, the ECU 2 controls the bypass valve 63*b* and the circulation valve 62*b* such that the temperature of the coolant for cooling the FC 4*b* increases. In this case, since the power generation of the FC 4*b* is suspended, even when the cooling water increases in temperature, the FC 4*b* is not affected. The control process for transition to the first single-unit power generation state when the power generation of the FC 4*b* is suspended is executed as described above.

In this example, the ECU 2 opens the bypass valves 63*a* and 63*b* and closes the circulation valves 62*a* and 62*b* to increase the temperature of the cooling water. However, the ECU 2 may increase the open degrees of the bypass valves 63*a* and 63*b* and may decrease the open degrees of the circulation valves 62*a* and 62*b*. This control decreases the flow rates of the cooling water flowing into the radiators 43*a* and 43*b*, and thus, the temperature of the cooling water increases.

However, when the bypass valves 63*a* and 63*b* are opened (i.e., the open degree is 100%) and the circulation valves 62*a* and 62*b* are closed (i.e., the open degree is 0%), no cooling water flows into the radiators 43*a* and 43*b*. Thus, the temperature of the cooling water further increases. That is, the ECU 2 can effectively increase the temperature of the cooling water by causing the bypass valves 63*a* and 63*b* and the circulation valves 62*a* and 62*b* to increase the flow rate of the coolant flowing through the detour pipes 46*a* and 46*b* such that no cooling water flows through the radiators 43*a* and 43*b*.

In addition, in this embodiment, the ECU 2 increases the temperature of the cooling water by controlling the bypass valve 63*a* and the circulation valve 62*a*, but this does not intend to suggest any limitation. The ECU 2 may increase the temperature of the cooling water by stopping the radiator 43*a*.

Figure 8:
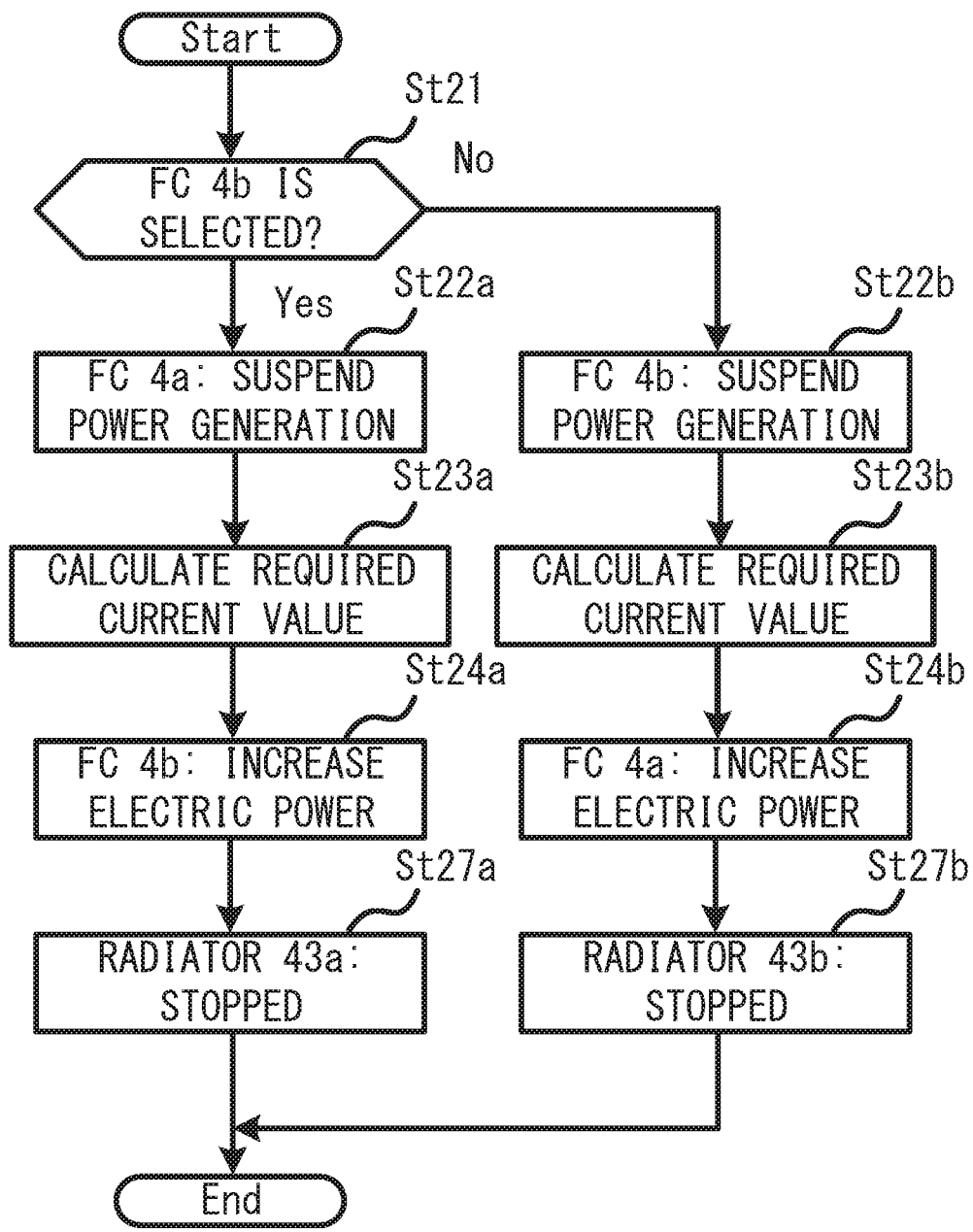
FIG. 8 is a flowchart of another exemplary control process to transition to the first single-unit power generation state.

FIG. 8 is a flowchart of another example of the control process for transition to the first single-unit power generation state. In FIG. 8, the same reference numerals are provided to the steps in common with those in FIG. 7, and the description thereof is omitted.

When suspending the power generation of the FC 4*a*, after step St24*a*, the ECU 2 stops the cooling operation of the radiator 43*a* (step St27*a*). This causes the cooling water of the cooling system 40*a* to increase in temperature because the cooling water is not cooled by the radiator 43*a*. That is, the ECU 2 controls the radiator 43*a* such that the temperature of the coolant for cooing the FC 4*a* increases.

When suspending the power generation of the FC 4*b*, after step St24*b*, the ECU 2 stops cooling operation of the radiator 43*b* (step St27*b*). This causes the cooling water of the cooling system 40*b* to increase in temperature because the cooling water is not cooled by the radiator 43*b*. That is, the ECU 2 controls the radiator 43*b* such that the temperature of the coolant for cooling the FC 4*b* increases.

In this example, the ECU 2 may increase the cooling temperature without stopping the cooling operation of the radiators 43*a* and 43*b*. However, when the cooling operation is stopped, the cooling water can more effectively increase in temperature.

Figure 9:
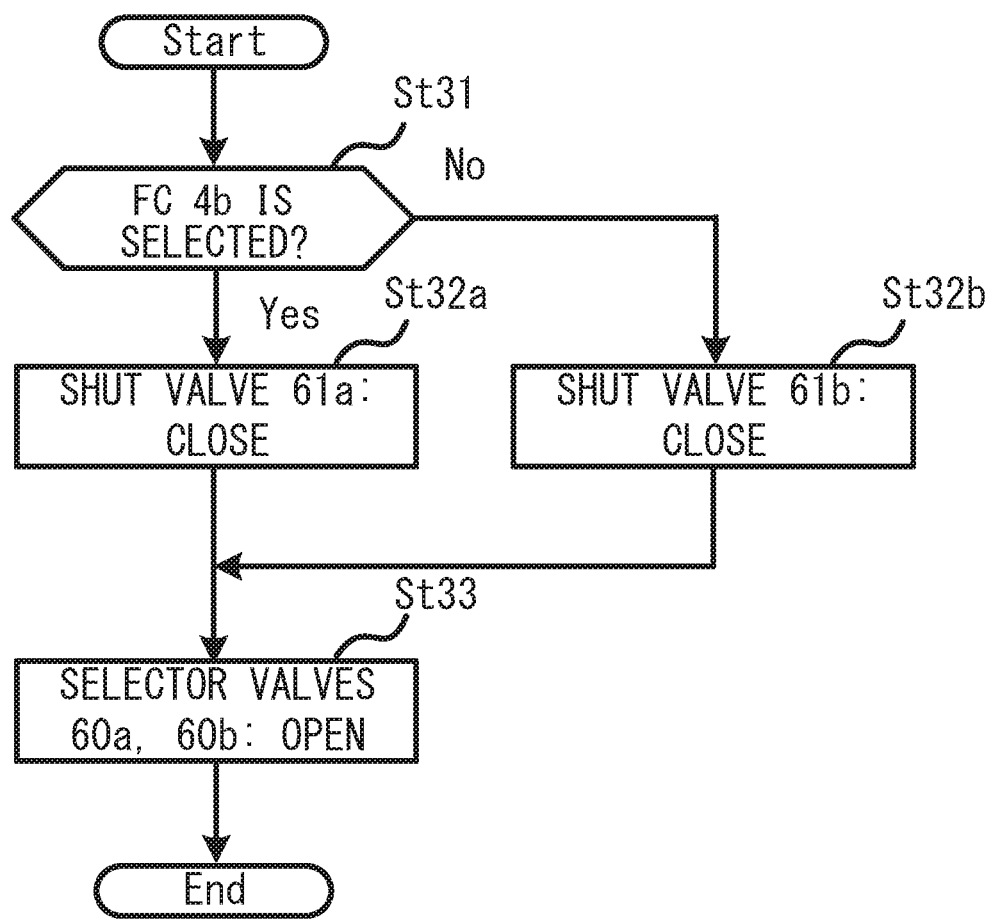
FIG. 9 is a flowchart of another exemplary control process to transition to the second single-unit power generation state.

FIG. 9 is a flowchart of an exemplary control process for transition to the second single-unit power generation state. This process is executed in step St14 described above.

The ECU 2 determines which of the FCs 4*a* and 4*b* has been selected in step St11 described above (step St31). When the FC 4*b* is selected (step St31/Yes), the ECU 2 closes the shut valve 61*a* (step St32*a*). This stops the cooling water of the cooling system 40*a* from flowing into the FC 4*a*.

When the FC 4*a* is selected (step St31/No), the ECU 2 closes the shut valve 61*b* (step St32*b*). This stops the cooling water of the cooling system 40*b* from flowing into the FC 4*b*.

Then, the ECU 2 opens the selector valves 60*a* and 60*b* (step St33). This causes the system 1 to transition to the second single-unit power generation state indicated by the reference character Gc or Gd in FIG. 4A or FIG. 4B. In this case, the cooling water circulates between the cooling systems 40*a* and 40*b* through the communication pipes 47*a* and 47*b*. Since the shut valves 61*a* and 61*b* are closed, the circulation amount of the cooling water becomes greater than that when the shut valves 61*a* and 61*b* are opened.

Thus, the flow rate of the cooling water flowing into the FC 4*a* or 4*b* that is generating electric power increases, and the heat capacity of the cooling water increases. Therefore, the heating of the cell near the outlet 4*a*3 or 4*b*3 of the cooling water of the FC 4*a* or 4*b* that is generating electric power is effectively reduced. The shut valves 61*a* and 61*b* may remain opened. The control process for transition to the second single-unit power generation state is executed as described above.

Figure 10:
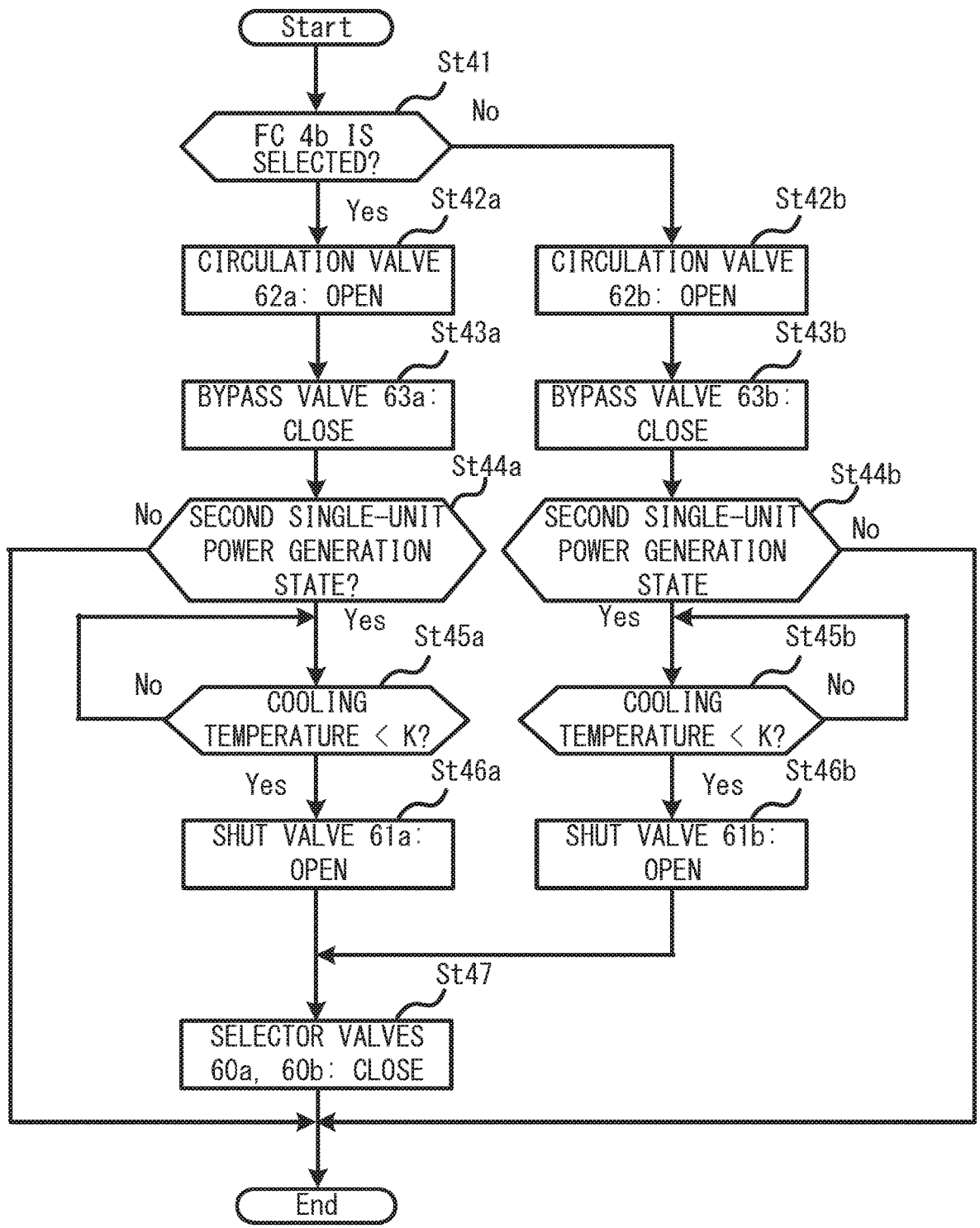
FIG. 10 is a flowchart of an exemplary return process.

FIG. 10 is a flowchart of an exemplary return process. This process is executed in step St16 described above.

The ECU 2 determines which of the FCs 4*a* and 4*b* has been selected in step St11 described above (step St41). When the FC 4*b* is selected (step St41/Yes), the ECU 2 executes the following steps St42*a* to St46*a*.

The ECU 2 opens the circulation valve 62*a* (step St42*a*) and closes the bypass valve 63*a* (step St43*a*). This causes the cooling water of the cooling system 40*a* to flow into the radiator 43*a* without flowing through the detour pipe 46*a*, and the cooling of the cooling water is resumed.

Next, the ECU 2 determines which of the first single-unit power generation state and the second single-unit power generation state the system 1 is in (step St44*a*). When the system 1 is in the first single-unit power generation state (step St44*a*/No), the process ends.

When the system 1 is in the second single-unit power generation state (step St44*a*/Yes), the ECU 2 compares the cooling temperature measured by the cooling temperature sensor 43*ta* and the threshold value K (step St45*a*). When the cooling temperature is equal to or greater than the threshold value K (step St45a/No), the cooling temperature and the threshold value K are compared again (step St45a).

When the cooling temperature is lower than the threshold value K (step St45a/Yes), the ECU 2 opens the shut valve 61a (step St46a). This causes the cooling water of the cooling system 40a to start flowing into the FC 4a.

When the FC 4a is selected (step St41/No), the ECU 2 executes the following steps St42b to St46b.

The ECU 2 opens the circulation valve 62b (step St42b) and closes the bypass valve 63b (step St43b). This causes the cooling water of the cooling system 40b to flow into the radiator 43b without flowing through the detour pipe 46b, and the cooling of the cooling water is thereby resumed.

Then, the ECU 2 determines which of the first single-unit power generation state and the second single-unit power generation state the system 1 is in (step St44b). When the system 1 is in the first single-unit power generation state (step St44b/No), the process ends.

When the system 1 is in the second single-unit power generation state (step St44b/Yes), the ECU 2 compares the cooling temperature measured by the cooling temperature sensor 43tb and the threshold value K (step St45b). When the cooling temperature is equal to or greater than the threshold value K (step St45b/No), the cooling temperature and the threshold value K are compared again (step St45b).

When the cooling temperature is lower than the threshold value K (step St45b/Yes), the ECU 2 opens the shut valve 61b (step St46b). This causes the cooling water of the cooling system 40b to start flowing into the FC 4b.

After step St46a or St46b, the ECU 2 closes the selector valves 60a and 60b (step St47). This control shuts-off the flow of the cooling water through the communication pipes 47a and 47b between the cooling systems 40a and 40b. Thereafter, the ECU 2 causes the FCs 4a and 4b to generate electric power in step St6 described above. Thus, the system 1 returns to the steady power generation state. The return process is executed as described above.

As described above, the ECU 2 controls the circulation valve 62a or 62b and the bypass valve 63a or 63b such that the temperature of the coolant of the FC 4a or 4b of which the power generation is suspended decreases. Thereafter, the ECU 2 opens the shut valve 61a or 61b and closes the selector valves 60a and 60b to resume the power generation of the FC 4a or 4b. Thus, the power generation performance of the FC 4a is inhibited from being affected by rapid flow of high-temperature cooling water into the FC 4a of which the power generation is suspended. In addition, when the cooling temperature becomes lower than the threshold value K after the ECU 2 opens the circulation valve 62a and the bypass valve 63a, the ECU 2 closes the selector valves 60a and 60b and opens the shut valve 61a or 61b. Thus, the influence to the power generation performance of the FC 4a or 4b is reduced more securely than in the case where the cooling temperature is not used.

The ECU 2 executes the following return process when the temperature of the cooling water is increased by stopping the radiator 43a or 43b as in the example illustrated in FIG. 8.

Figure 11:
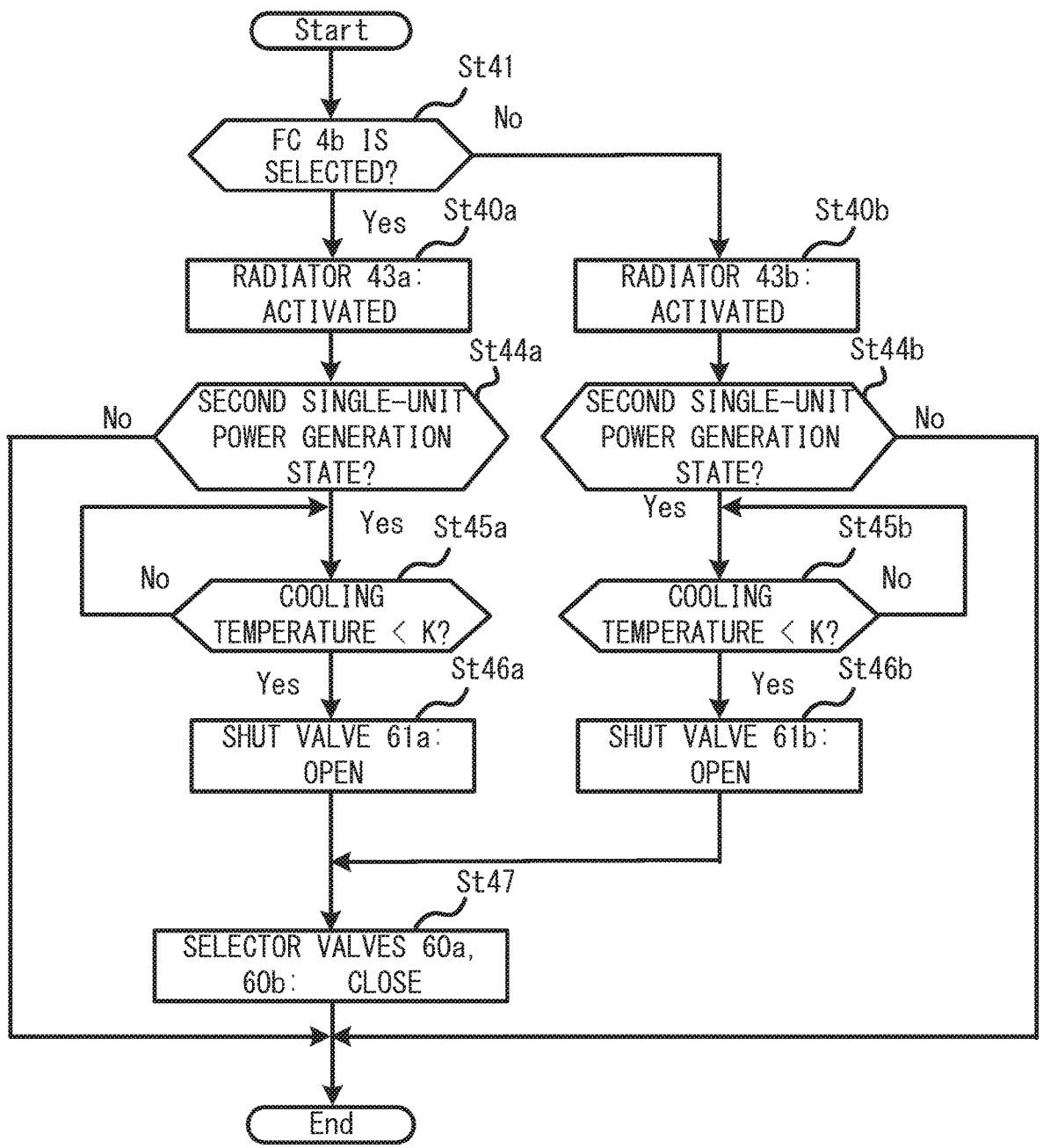
FIG. 11 is a flowchart of another exemplary return process.

FIG. 11 is a flowchart of another example of the return process. In FIG. 11, the same reference numerals are provided to the steps in common with those in FIG. 10, and the description thereof is omitted.

When the FC 4b is selected (step St41/Yes), the ECU 2 activates the radiator 43a (step St40a). This resumes the cooling of the cooling water by the radiator 43a.

When the FC 4a is selected (step St41/No), the ECU 2 activates the radiator 43b (step St40b). This control resumes the cooling of the cooling water by the radiator 43b. This example also has the same advantage as the above.

[Method for Determining a Possibility of Flooding]

Next, a method for determining a possibility of flooding employed by the ECU 2 will be described. The following describes an example of a method for determining a possibility of flooding, but does not intend to suggest any limitation. Other methods for determining a possibility of flooding may be employed.

(First Example of Determination)

Figure 12A:
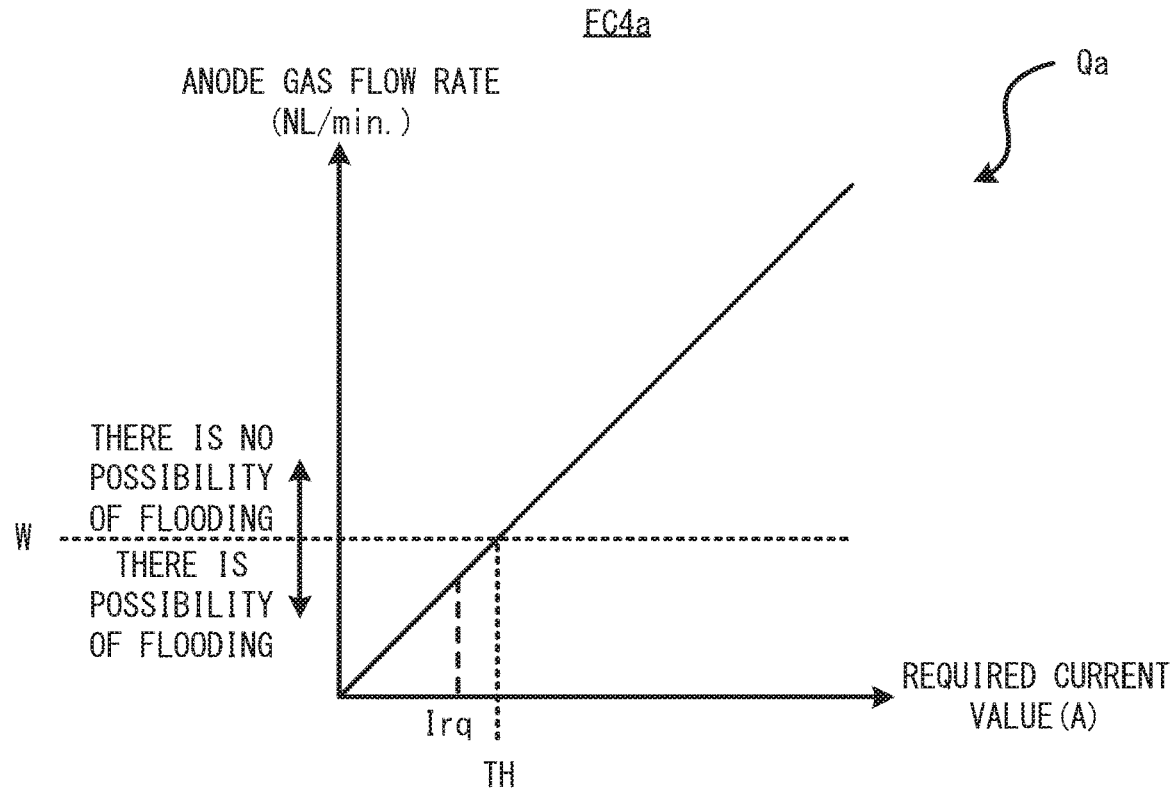
FIG. 12A and FIG. 12B illustrate examples of determination of a possibility of flooding in the steady power generation state.
Figure 12B:
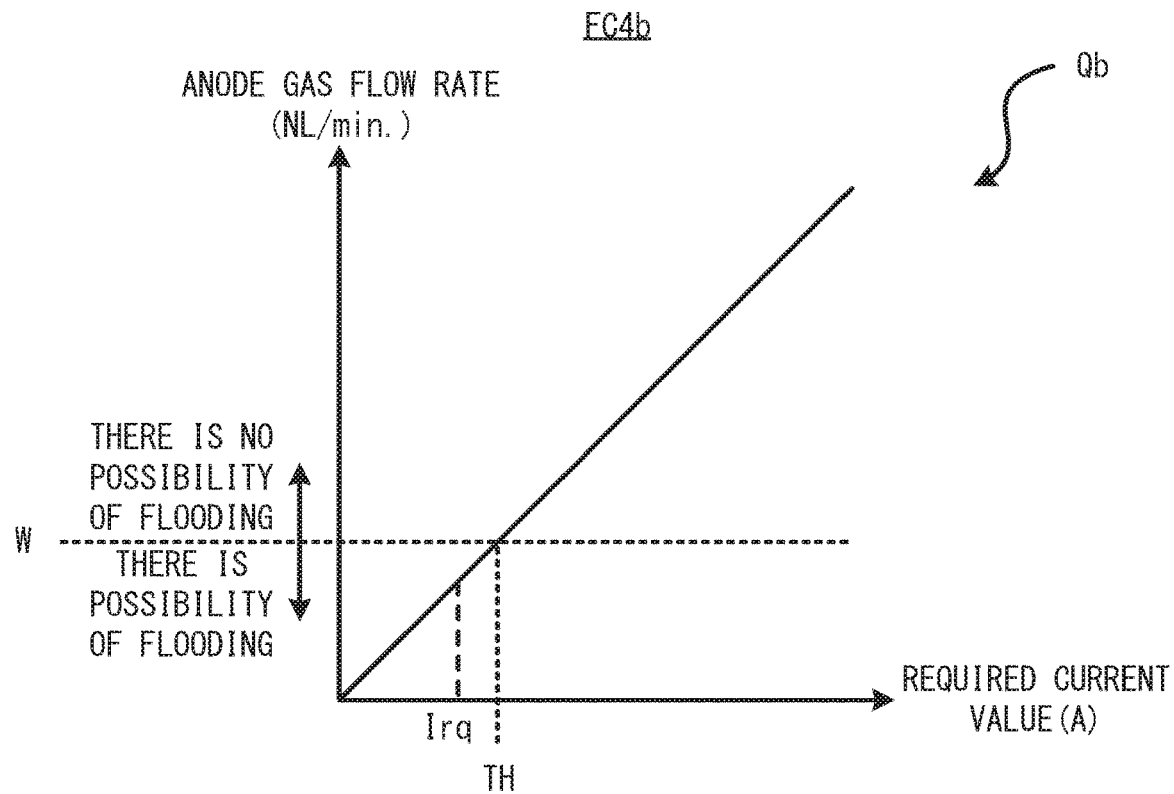

FIG. 12A and FIG. 12B illustrate an example of determination of a possibility of flooding in the steady power generation state. FIG. 12A and FIG. 12B illustrate a relationship between a required current value (A) and an anode gas flow rate (NL/min.). The anode gas flow rate is the sum of the supply amounts of the anode gas from the INJs 26a and 26b according to the required current value and the amounts of the anode gas circulating through the return pipes 23a and 23b, i.e., the circulation amount of the anode off-gas. The required current value and the anode gas flow rate practically have a proportional relationship.

The reference character Qa in FIG. 12A presents a relationship between the required current value of the FC 4a and the anode gas flow rate, and the reference character Qb in FIG. 12B presents a relationship between the required current value of the FC 4b and the anode gas flow rate. The relationships between the required current values of the FCs 4a and 4b and the anode gas flow rates are identical to each other.

The ECU 2 stores the threshold value TH for determining whether there is a possibility of flooding in a memory or the like in advance. The threshold value TH is determined through simulations or experiments based on the various types of performance of the FCs 4a and 4b.

When the required current value is equal to or greater than the threshold value TH, the ECU 2 determines that there is no possibility of flooding. On the other hand, when the required current value is less than the threshold value TH, the ECU 2 determines that there is a possibility of flooding. This is because as the required current value becomes less, the anode gas flow rate becomes less, and therefore it becomes difficult to discharge liquid water within the return pipes 23a and 23b. That is, when the anode gas flows at a flow rate equal to or greater than the anode gas flow rate W corresponding to the threshold value TH, liquid water is sufficiently discharged. On the other hand, when the anode gas flows at a flow rate less than the anode gas flow rate W, it is impossible to sufficiently discharge liquid water.

For example, in the above steps St7 and St15, when the required current value Irq while both the FCs 4a and 4b are generating electric power is less than the threshold value TH, the ECU 2 determines that there is a possibility of flooding.

Figure 13A:
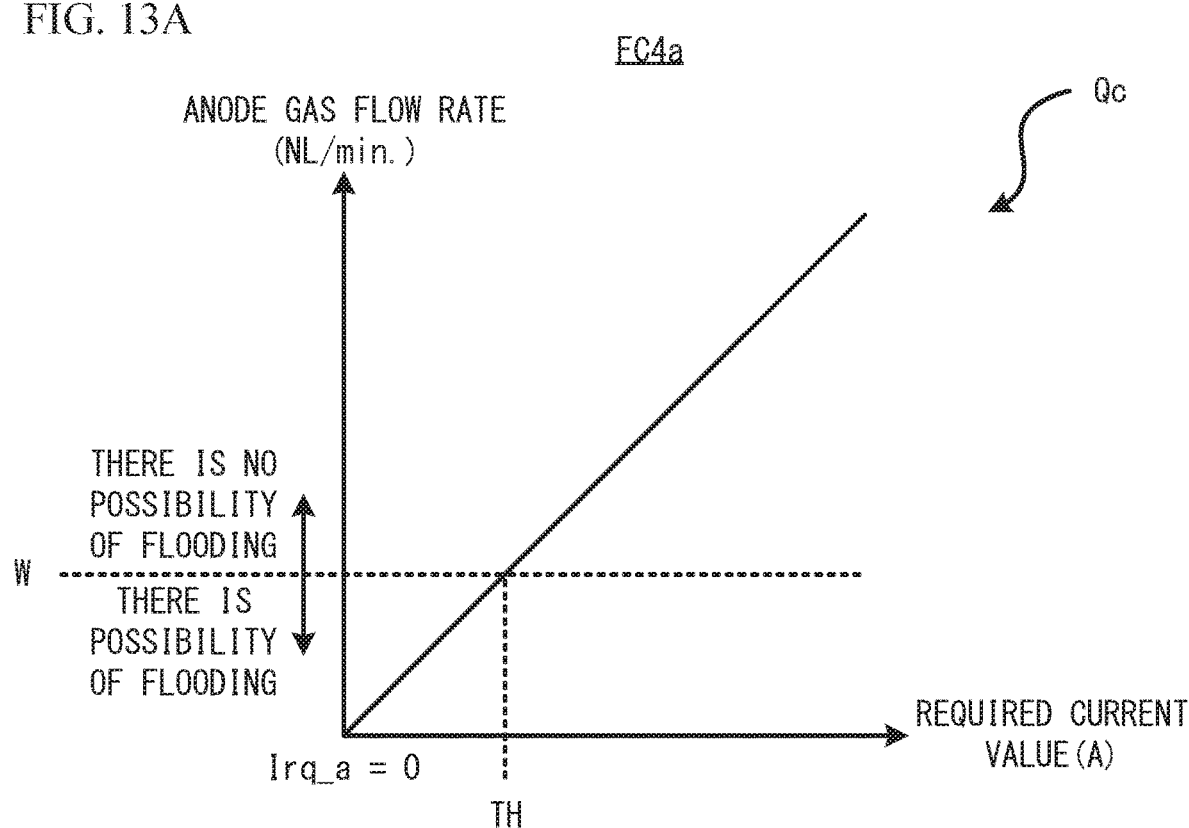
FIG. 13A and FIG. 13B illustrate examples of determination of a possibility of flooding in the first single-unit power generation state.
Figure 13B:
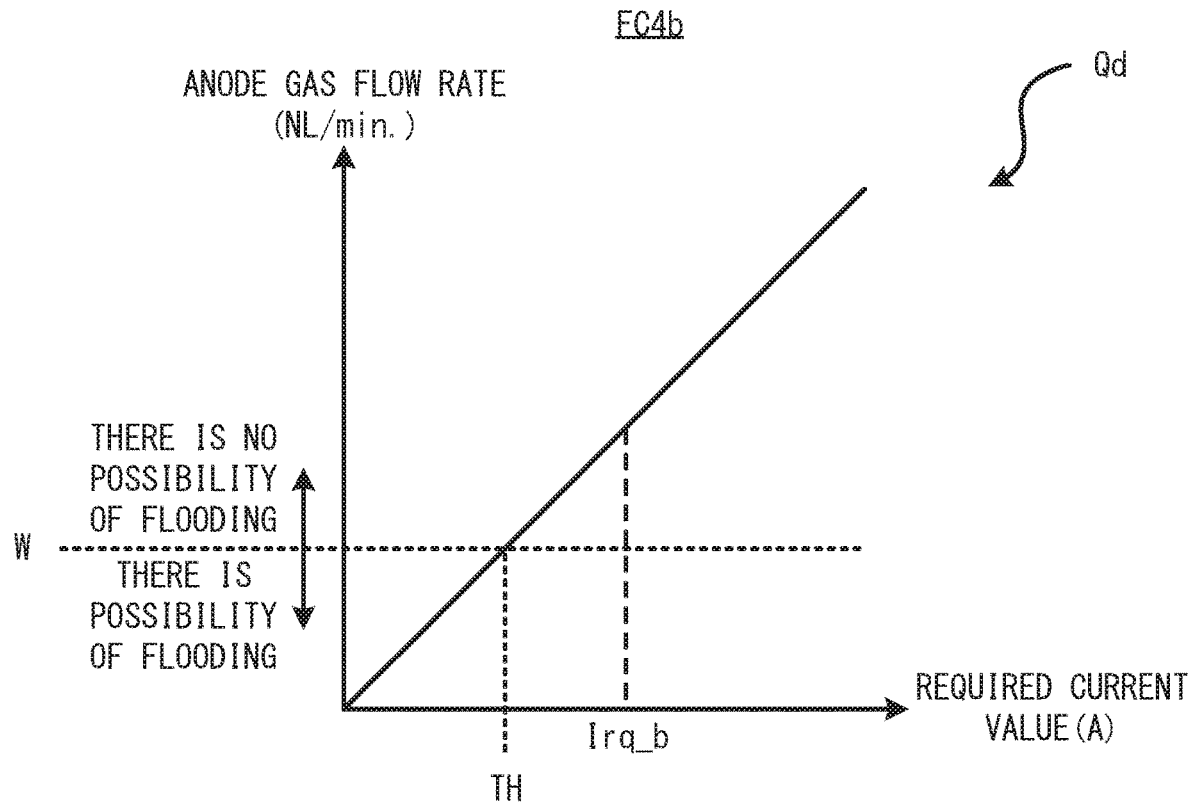

FIG. 13A and FIG. 13B illustrate an example of determination of a possibility of flooding in the first single-unit power generation state. In FIG. 13A and FIG. 13B, a description of the contents in common with FIG. 12A and FIG. 12B will be omitted.

For example, considered is a case where the power generation of the FC 4a is suspended and the FC 4b generates electric power. In this case, the ECU 2 sets the required current value Irq_a of the FC 4a at 0. Thus, the required current value Irq_a becomes less than the threshold value TH. However, the power generation of the FC 4a is suspended. Thereby, the production of liquid water is also stopped, and thus flooding is inhibited.

In addition, the ECU 2 increases the required current value Irq_b of the FC 4b to compensate for the decline in generated electric power due to the suspension of the power generation of the FC 4a. When the required current value Irq_b becomes equal to or greater than the threshold value TH due to this control, it is determined that there is no possibility of flooding. For example, in the step St13 described above, when the required current value Irq_b becomes greater than the threshold value TH, the ECU 2 determines that there is no possibility of flooding in the FC 4b.

Figure 14:
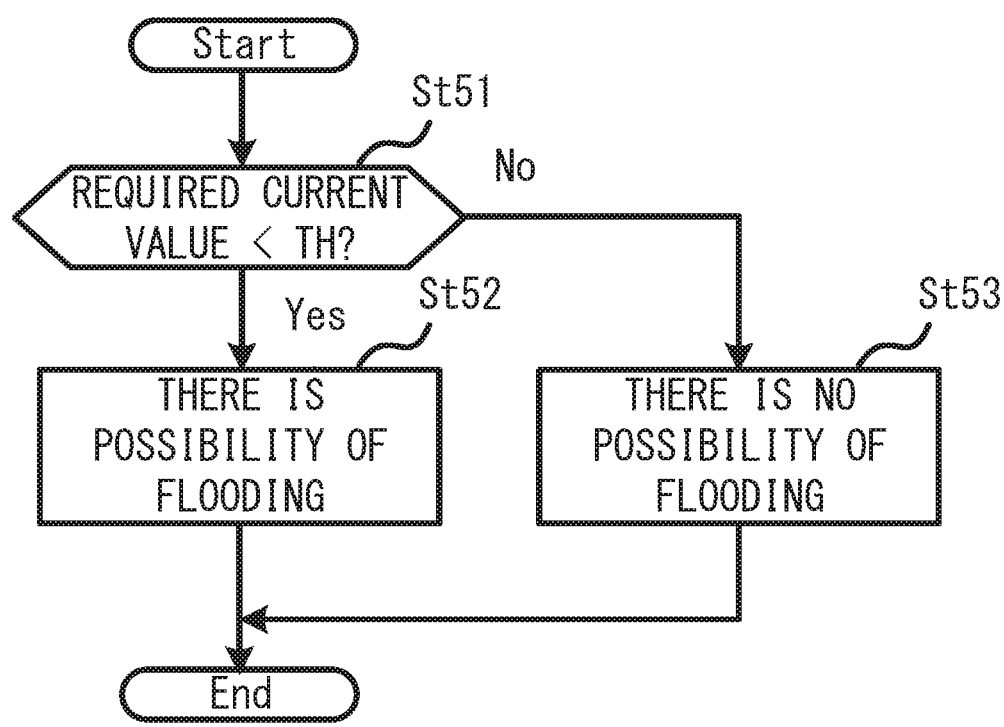
FIG. 14 is a flowchart of an exemplary process of a first example of determination of a possibility of occurrence of flooding.

FIG. 14 is a flowchart of an exemplary process of the first example of determination of a possibility of flooding. This process is executed in the steps St7, St13, and St15 described above.

The ECU 2 compares the required current value Irq, Irq_a, Irq_b with the threshold value TH (step St51). When the required current value Irq, Irq_a, Irq_b is less than the threshold value TH (step St51/Yes), the ECU 2 determines that there is a possibility of flooding (step St52). When the required current value Irq, Irq_a, Irq_b is equal to or greater than the threshold value TH (step St51/No), the ECU 2 determines that there is no possibility of flooding (step St53). The process of the first example of determination is executed as described above.

As described above, when the required current value Irq, Irq_a, Irq_b is less than the threshold value TH, the ECU 2 determines that there is a possibility of flooding. Thus, occurrence of flooding can be predicted with high accuracy based on the required current value Irq, Irq_a, Irq_b.

(Second Example of Determination)

Figure 15:
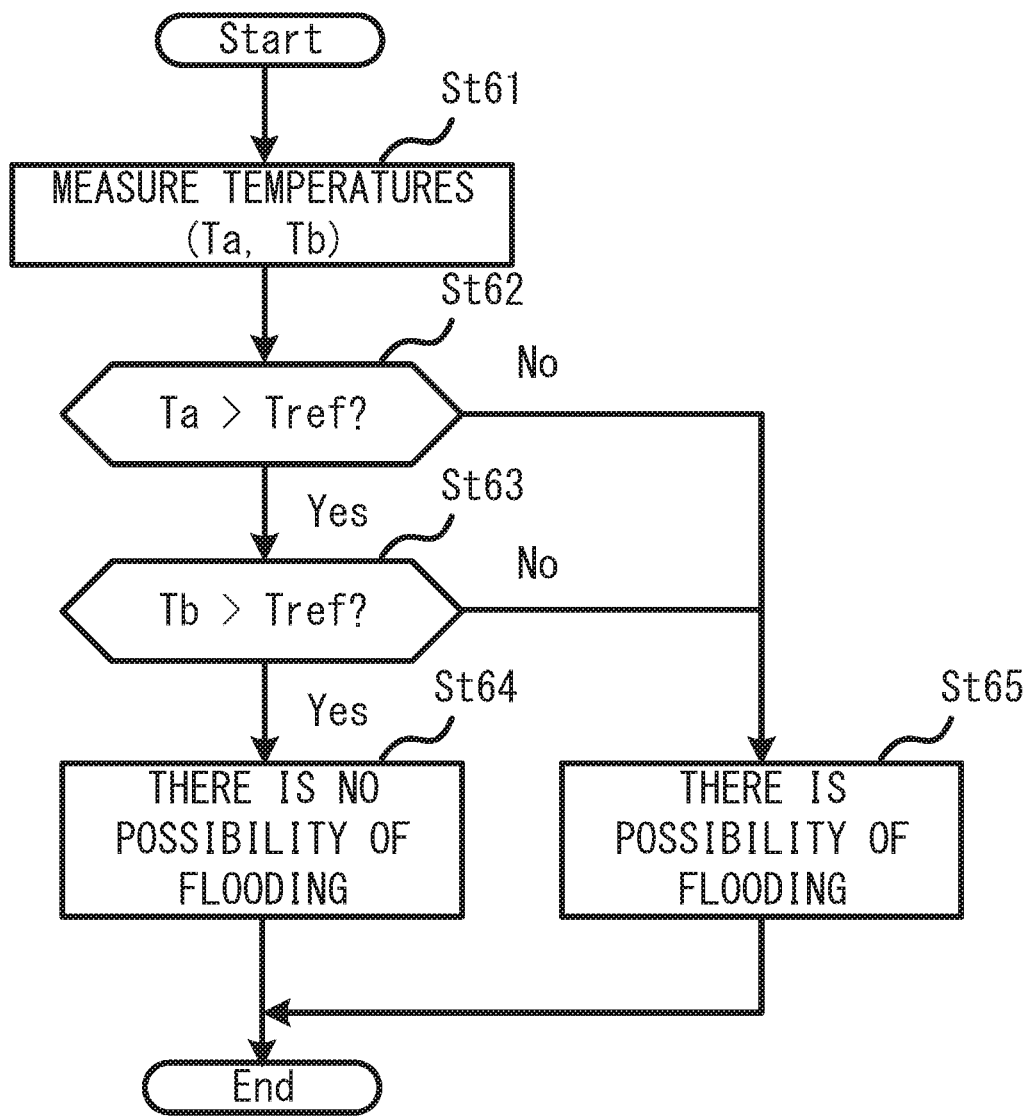
FIG. 15 is a flowchart of an exemplary process of a second example of determination of a possibility of occurrence of flooding.

FIG. 15 is a flowchart of an exemplary process of a second example of determination of a possibility of flooding. This process is executed in the steps St7, St13, and St15 described above. In this example, the temperatures Ta and Tb of the FCs 4a and 4b are used for determining whether there is a possibility of flooding. As the temperatures Ta and Tb decrease, the amount of saturated water vapor decreases. Thus, liquid water in the FCs 4a and 4b increases and flooding is likely to occur.

The ECU 2 causes the cell temperature sensors 45a and 45b to measure the temperatures Ta and Tb of the FCs 4a and 4b, respectively (step St61). Then, the ECU 2 compares the temperature Ta of the FC 4a with the temperature reference value Tref (step St62). When the temperature Ta is equal to or less than the temperature reference value Tref (step St62/No), the ECU 2 determines that there is a possibility of flooding (step St65). The temperature reference value Tref is determined through simulations or experiments based on the various types of performance of the FCs 4a and 4b.

When the temperature Ta is higher than the temperature reference value Tref (step St62/Yes), the ECU 2 compares the temperature Tb of the FC 4b with the temperature reference value Tref (step St63). When the temperature Tb is equal to or less than the temperature reference value Tref (step St63/No), the ECU 2 determines that there is a possibility of flooding (step St65).

When the temperature Tb is higher than the temperature reference value Tref (step St63/Yes), the ECU 2 determines that there is no possibility of flooding (step St64). The process of the second example of determination is executed as described above.

As described above, when the temperatures Ta and Tb measured by the cell temperature sensors 45a and 45b are equal to or less than the temperature reference value Tref, the ECU 2 determines that there is a possibility of flooding due to the power generation of the FCs 4a and 4b. Thus, occurrence of flooding can be predicted with high accuracy based on the temperatures Ta and Tb.

(Third Example of Determination)

Figure 16:
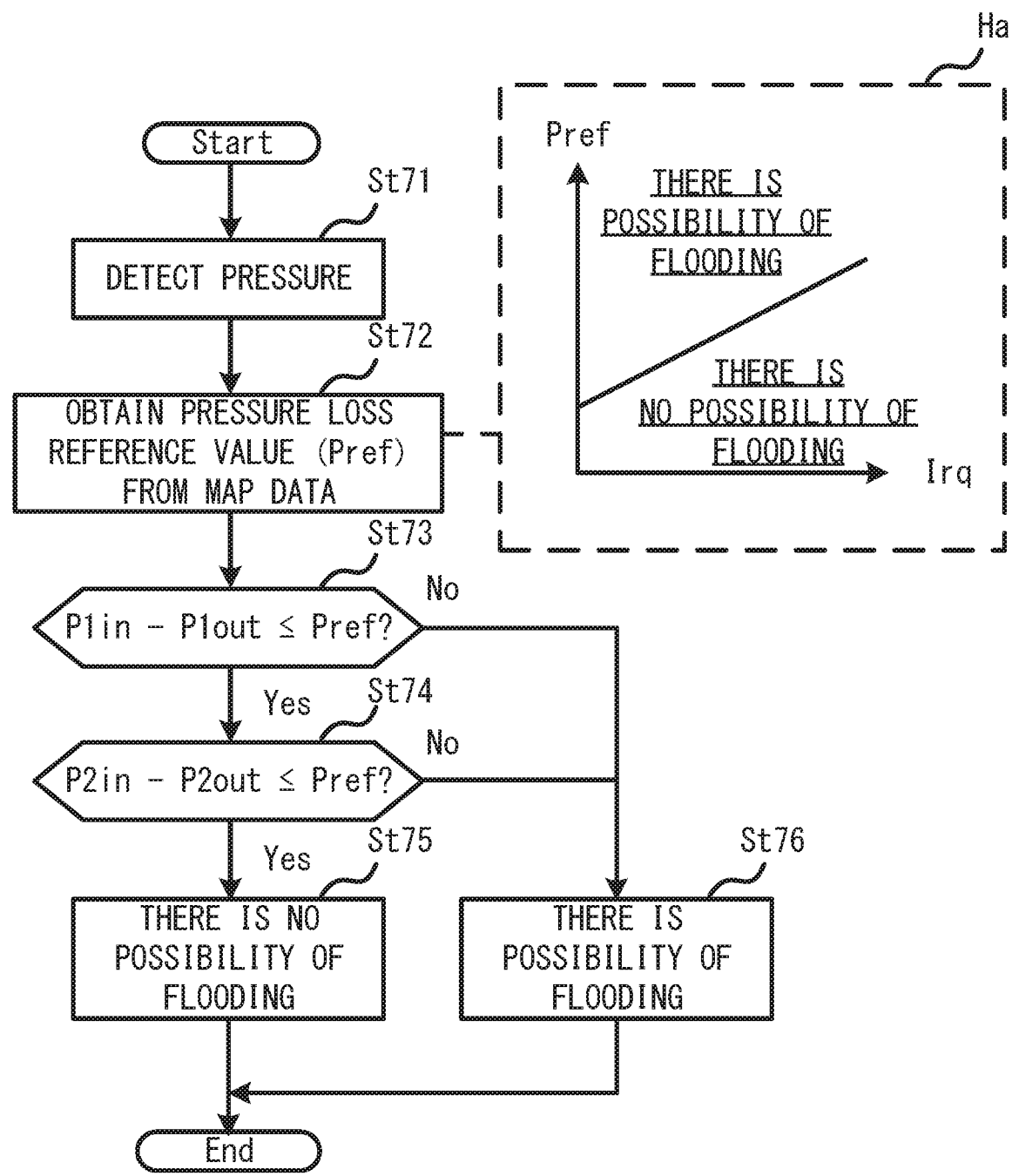
FIG. 16 is a flowchart of an exemplary process of a third example of determination of a possibility of occurrence of flooding.

FIG. 16 is a flowchart of a process of a third example of determination of a possibility of flooding. This process is executed in step St7 described above. In this example, the pressure losses of the anode gas in the FCs 4a and 4b are used to determine a possibility of flooding.

The pressure loss in the FC 4a is calculated as the difference between the pressures detected by the inlet pressure sensor 21ap and the outlet pressure sensor 23ap, while the pressure loss in the FC 4b is calculated as the difference between the pressures detected by the inlet pressure sensor 21bp and the outlet pressure sensor 23bp. The inlet pressure sensors 21ap and 21bp and the outlet pressure sensors 23ap and 23bp are examples of first and second detection devices for detecting a pressure loss of the anode gas.

The ECU 2 causes the inlet pressure sensors 21ap and 21bp and the outlet pressure sensors 23ap and 23bp to detect the pressures (step St71). Here, the pressures detected by the inlet pressure sensors 21ap and 21b are represented by P1$in$ and P2$in$, respectively, and the pressures detected by the outlet pressure sensors 23ap and 23bp are represented by P1$out$ and P2$out$, respectively.

Then, the ECU 2 obtains the pressure loss reference value Pref corresponding to the required current value Irq from, for example, map data stored in a memory (step St72). The reference character Ha presents an example of a relationship between the required current value Irq and the pressure loss reference value Pref. The pressure loss reference value Pref is the threshold value of the pressure loss for determining whether there is a possibility of flooding, and becomes higher as the required current value Irq becomes higher. When the pressure loss is higher than the pressure loss reference value Pref, the ECU 2 determines that there is a possibility of flooding. When the pressure loss is lower than the pressure loss reference value Pref, the ECU 2 determines that there is no possibility of flooding.

Then, the ECU 2 compares the pressure loss (P1$in$–P1$_{out}$) in the FC 4a with the pressure loss reference value Pref (step St73). When the pressure loss is higher than the pressure loss reference value Pref (step St73/No), the ECU 2 determines that there is a possibility of flooding (step St76).

In addition, when the pressure loss is equal to or less than the pressure loss reference value Pref (step St73/Yes), the ECU 2 compares the pressure loss (P2$in$–P2$out$) in the FC 4b with the pressure loss reference value Pref (step St74). When the pressure loss is higher than the pressure loss reference value Pref (step St74/No), the ECU 2 determines that there is a possibility of flooding (step St76).

When the pressure loss is equal to or less than the pressure loss reference value Pref (step St74/Yes), the ECU 2 determines that there is no possibility of flooding (step St75). The process of the third example of determination is executed as described above.

As described above, the ECU 2 determines the pressure loss reference value Pref according to the required current values Irq of the FCs 4a and 4b, and when the pressure loss detected in one of the FCs 4a and 4b is greater than the pressure loss reference value Pref, determines that there is a possibility of flooding due to the power generation of the FCs 4a and 4b. Thus, the ECU 2 can predict occurrence of flooding with high accuracy based on the required current value Irq and the pressure loss.

The above process can be also applied to the step St13 described above. In this case, only one of the steps St73 and St74 that corresponds to the FC 4a or 4b that continues to generate electric power is executed. Additionally, in step St72, the pressure loss reference value Pref corresponding to the required current value Irq_a or Irq_b of the FC 4a or 4b that continues to generate electric power is obtained.

(Fourth Example of Determination)

Figure 17:
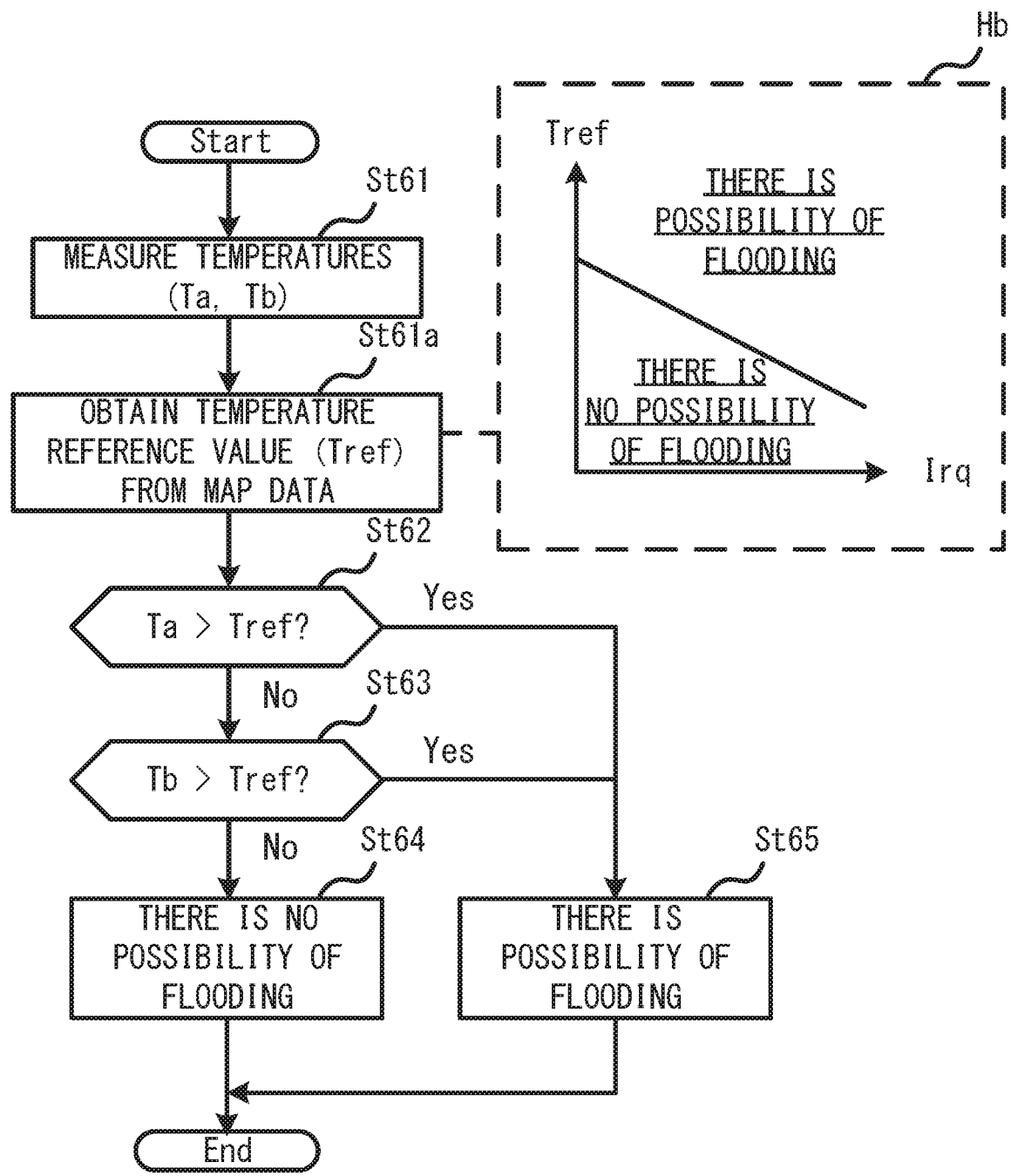
FIG. 17 is a flowchart of an exemplary process of a fourth example of determination of a possibility of occurrence of flooding.

FIG. 17 is a flowchart of an exemplary process of a fourth example of determination of a possibility of flooding. In FIG. 17, the same reference numerals are provided to steps in common with those in FIG. 15, and the description thereof is omitted. This process is executed in the steps St7 and St15 described above.

In this example, as in the second example of determination, the temperatures Ta and Tb of the FCs 4a and 4b are used to determine a possibility of flooding, but the temperature reference value Tref is not a predetermined value and is determined based on the required current value Irq.

The ECU 2 obtains the temperature reference value Tref corresponding to the required current value Irq from, for example, map data stored in a memory (step St61a). The reference character Hb presents an example of a relationship between the required current value Irq and the temperature reference value Tref. The temperature reference value Tref is threshold values for the temperatures Ta and Tb for determining whether there is a possibility of flooding, and increases as the required current value Irq increases. When the temperatures Ta and Tb are higher than the temperature reference value Tref, the ECU 2 determines that there is a possibility of flooding. When the temperatures Ta and Tb are lower than the temperature reference value Tref, the ECU 2 determines that there is no possibility of flooding.

As described above, since the ECU 2 determines the temperature reference value Tref according to the required current values Irq of the FCs 4a and 4b, the ECU 2 can predict occurrence of flooding with high accuracy based on the required current value Irq and the temperature.

The above process can be also applied to the step St13 described above. In this case, only one of the steps St62 and St63 that corresponds to the FC 4a or 4b that continues to generate electric power is executed. In addition, in step St61 a, the temperature reference value Tref corresponding to the required current value Irq_a or Irq_b of the FC 4a or 4b that continues to generate electric power is obtained.

(Fifth Example of Determination)

Figure 18:
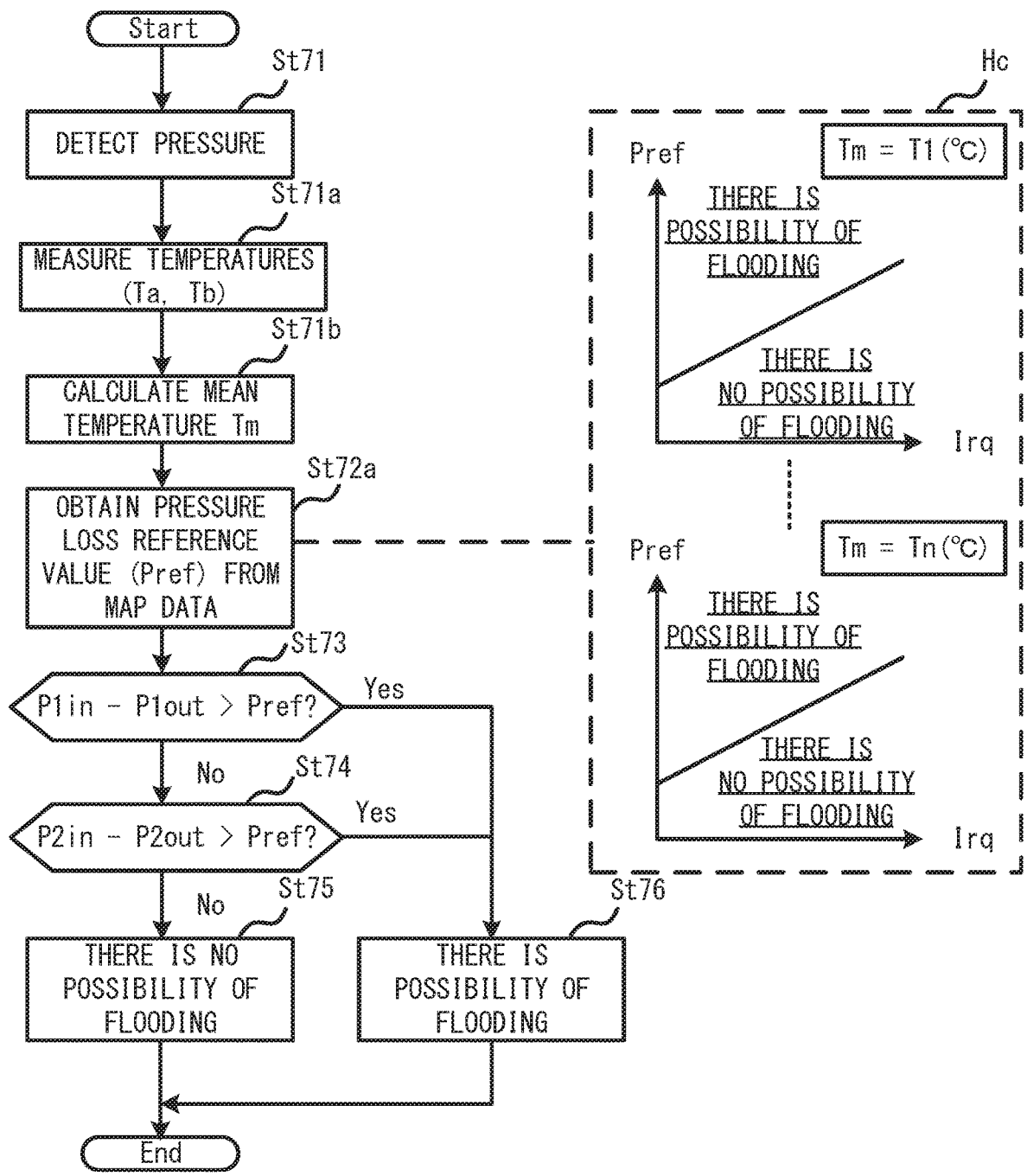
FIG. 18 is a flowchart of an exemplary process of a fifth example of determination of a possibility of occurrence of flooding.

FIG. 18 is a flowchart of an exemplary process of a fifth example of determination of a possibility of flooding. In FIG. 18, the same reference numerals are provided to steps in common with those in FIG. 16, and the description thereof is omitted. This process is executed in step St7 described above.

In this example, as in the third example of determination, the pressure losses of the anode gas in the FCs 4a and 4b are used for determining whether there is a possibility of flooding, but the pressure loss reference value Pref is determined based on not only the required current value Irq but also the temperatures Ta and Tb.

After detecting the pressure (step St71), the ECU 2 causes the cell temperature sensors 45a and 45b to measure the temperatures Ta and Tb of the FCs 4a and 4b, respectively (step St71a). Then, the ECU 2 calculates the mean temperatures Tm of the temperatures Ta and Tb (step St71b).

Then, the ECU 2 obtains the pressure loss reference value Pref corresponding to the required current value Irq and the mean temperature Tm from, for example, map data stored in a memory (step St72a). The reference character Hc presents an example of a relationship between the required current value Irq and the pressure loss reference value Pref. The map data indicates a relationship between the required current value Irq and the pressure loss reference value Pref with respect to each mean temperature Tm=T1, T2, . . . , Tn (n: positive integer).

The pressure loss reference value Pref increases as the required current value Irq increases. When the pressure loss is higher than the pressure loss reference value Pref, the ECU 2 determines that there is a possibility of flooding. When the pressure loss is lower than the pressure loss reference value Pref, the ECU 2 determines that there is a possibility of flooding.

As described above, the ECU 2 determines the pressure loss reference value Pref according to the required current value Irq and the temperatures Ta and Tb of the FCs 4a and 4b. When the pressure loss detected in either one of the FCs 4a and 4b is greater than the pressure loss reference value Pref, the ECU 2 determines that there is a possibility of flooding due to the power generation of the FCs 4a and 4b. Thus, the ECU 2 can predict occurrence of flooding with high accuracy based on the required current value Irq, the pressure loss, and the temperatures Ta and Tb. The ECU 2 determines the pressure loss reference value Pref based on the mean temperature Tm, but this does not intend to suggest any limitation. The ECU 2 may determine the pressure loss reference value Pref by referring to the map data based on one of the temperatures Ta and Tb.

The above process can be also applied to the steps St13a and St13b described above. In this case, only one of the steps St73 and St74 corresponding to the FC 4a or 4b that continues to generate electric power is executed. In addition, in step St72, the pressure loss reference value Pref according to the required current value Irq_a or Irq_b and the temperature Ta or Tb of the FC 4a or 4b that continues to generate electric power is obtained. The step St71b is not executed.

[Another Example of the Fuel Cell System 1]

The system including two FCs 4a and 4b has been described, but the number of fuel cells in the system is not particularly limited. As an example, the following describes a system including three fuel cells.

Figure 19:
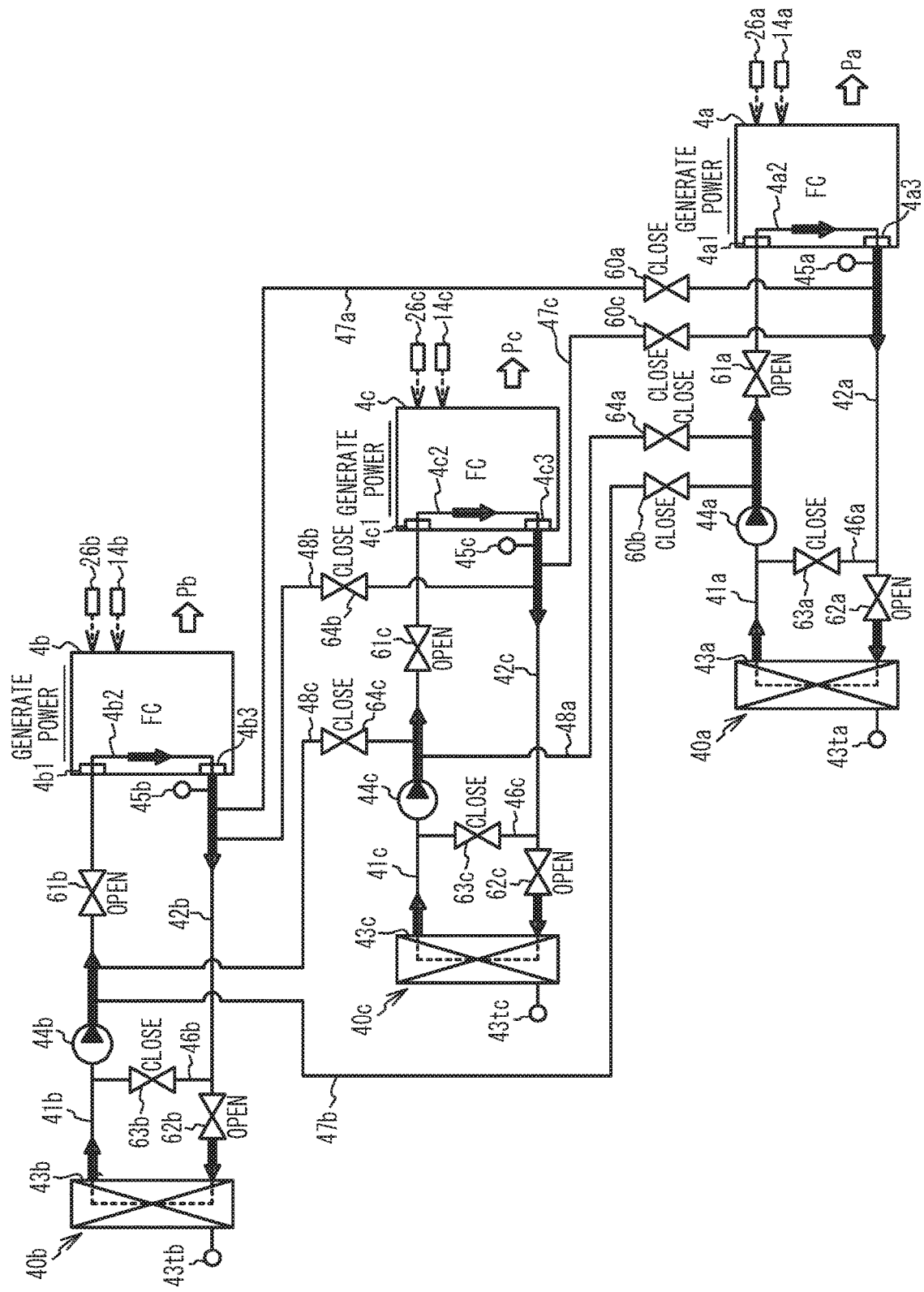
FIG. 19 illustrates an exemplary configuration of a fuel cell system including three fuel cells.

FIG. 19 illustrates an exemplary configuration of a fuel cell system including three FCs 4a, 4b, and 4c. In FIG. 19, the same reference numerals are provided to components in common with those in FIG. 1 and FIG. 2, and the description thereof is omitted.

The FC 4c, as an example of a third fuel cell, is added to the system 1 of this example. The FC 4c includes a cooling system 40c for cooling the FC 4c as with other FCs 4a and 4b. Additionally, the FC 4c includes an inlet 4c1, a cooling water path 4c2, and an outlet 4c3 of cooling water as with other FCs 4a and 4b. The performance and size of the FC 4c are the same as those of the FCs 4a and 4b.

The cooling system 40c includes a cooling water supply pipe 41c, a cooling water discharge pipe 42c, a radiator 43c, a pump 44c, and a detour pipe 46c. In addition, the cooling systems 40a and 40c share communication pipes 47c and 48a, and the cooling systems 40b and 40c share communication pipes 48b and 48c.

The radiator 43c cools the cooling water of which the temperature has increased because of absorption of the heat of the FC 4c by air-cooling. The cooled cooling water passes through the cooling water supply pipe 41c and is supplied to the FC 4c. The cooling water supply pipe 41c is connected to the inlet of the cooling water manifold of the FC 4c. The radiator 43c includes a cooling temperature sensor 43tc for measuring the temperature of the cooling water cooled by the radiator 43c. The cooling temperature sensor 43tc is used in the return process as with, for example, other cooling temperature sensors 43*ta* and 43*tb*.

The pump 44*c* for circulating the cooling water between the radiators 43*c* and the FC 4*c* is disposed in the cooling water supply pipe 41*c*. The cooling water flows through the cooling water supply pipe 41*c* and the cooling water discharge pipe 42*c* to circulate between the radiator 43*c* and the FC 4*c*. The cooling water supply pipe 41*c* is an example of a third coolant supply path through which the cooling water flows from the radiator 43*c* to the FC 4*c*. The cooling water discharge pipe 42*c* is an example of a third coolant discharge path through which the cooling water flows from the FC 4*c* to the radiator 43*c*. The radiator 43*c* is an example of a third cooling device for cooling the coolant that has cooled the FC 4*c*.

A shut valve 61*c* is disposed in the cooling water supply pipe 41*c* between the FC 4*c* and the pump 44*c*. When the shut valve 61*c* is closed, the flow of the cooling water to the FC 4*c* is restricted. A cell temperature sensor 45*c* for measuring the temperature of the cooling water discharged from the FC 4*c* is disposed in the cooling water discharge pipe 42*c*. The cell temperature sensor 45*c* measures the temperature of the FC 4*c*. The cell temperature sensor 45*c* is used to determine a possibility of flooding as with, for example, other cell temperature sensors 45*a* and 45*b*.

Additionally, a circulation valve 62*c* is disposed in the cooling water discharge pipe 42*c*. The circulation valve 62*c* adjusts the flow rate of the cooling water flowing through the radiator 43*c* according to its open degree.

The detour pipe 46*c* is connected between the cooling water discharge pipe 42*c* and the cooling water supply pipe 41*c*. A first end of the detour pipe 46*c* is connected to the cooling water supply pipe 41*c* on the upstream side of the pump 44*c*, and a second end of the detour pipe 46*c* is connected to the cooling water discharge pipe 42*c* on the downstream side of the circulation valve 62*c*. The detour pipe 46*c* is an example of a second detour path connected between the cooling water discharge pipe 42*c* and the cooling water supply pipe 41*c* so as to bypass the radiator 43*c*.

A bypass valve 63*c* is disposed in the detour pipe 46*c*. The bypass valve 63*c* adjusts the flow rate of the cooling water flowing from the cooling water discharge pipe 42*c* to the cooling water supply pipe 41*c* according to its open degree. The bypass valve 63*c* and the circulation valve 62*c* adjust the ratio of the flow rate of the cooling water flowing through the radiator 43*c* and the flow rate of the cooling water flowing through the detour pipe 46*c* in conjunction with each other. The bypass valve 63*c* and the circulation valve 62*c* are an example of a second adjusting device for adjusting the flow rate of the cooling water flowing through the detour pipe 46*c*. Instead of the bypass valve 63*c* and the circulation valve 62*c*, a three-way valve may be provided in a part where the cooling water discharge pipe 42*c* and the detour pipe 46*c* are connected.

The communication pipe 47*c* is connected between the cooling water discharge pipes 42*a* and 42*c*. A first end of the communication pipe 47*c* is connected to the cooling water discharge pipe 42*a* on the upstream side of the circulation valve 62*a*, and a second end of the communication pipe 47*c* is connected to the cooling water discharge pipe 42*c* on the upstream side of the circulation valve 62*c*.

The communication pipe 48*b* is connected between the cooling water discharge pipes 42*b* and 42*c*. A first end of the communication pipe 48*b* is connected to the cooling water discharge pipe 42*b* on the upstream side of the circulation valve 62*b*, and a second end of the communication pipe 48*b* is connected to the cooling water discharge pipe 42*c* on the upstream side of the circulation valve 62*c*.

The communication pipe 48*a* is connected between the cooling water supply pipes 41*a* and 41*c*. A first end of the communication pipe 48*a* is connected to the cooling water supply pipe 41*a* on the upstream side of the shut valve 61*a* and on the downstream side of the pump 44*a*, and a second end of the communication pipe 48*a* is connected to the cooling water supply pipe 41*c* on the upstream side of the shut valve 61*c* and on the downstream side of the pump 44*c*. The communication pipe 47*c* connects the cooling water discharge pipes 42*a* and 42*c* to each other, and the communication pipe 48*a* connects the cooling water supply pipes 41*a* and 41*c* to each other. The communication pipes 47*c* and 48*a* are examples of third and fourth connection paths.

Selector valves 64*a* and 60*c* are disposed in the communication pipes 48*a* and 47*c*, respectively. The selector valves 64*a* and 60*c* open and close the communication pipes 48*a* and 47*c*, respectively. The selector valves 64*a* and 60*c* are examples of third and fourth opening/closing valves disposed in the communication pipes 48*a* and 47*c*, respectively. The cooling water supply pipes 41*a* and 41*c* are communicated with each other by opening the selector valve 64*a*, and the cooling water discharge pipes 42*a* and 42*c* are communicated with each other by opening the selector valve 60*c*.

This causes the cooling water to circulate between the cooling water supply pipe 41*a* and the cooling water discharge pipe 42*a*, through which the cooling water circulates, of the FC 4*a* and the cooling water supply pipe 41*c* and the cooling water discharge pipe 42*c*, through which the cooling water circulates, of the FC 4*c*. Unlike this example, the communication pipe 48*a* may connect the cooling water supply pipe 41*a* and the cooling water discharge pipe 42*c* to each other, and the communication pipe 47*c* may connect the cooling water supply pipe 41*c* and the cooling water discharge pipe 42*a* to each other. Even in this case, as in the case described above, the cooling water circulates between the cooling water supply pipe 41*a* and the cooling water discharge pipe 42*a* of the FC 4*a* and the cooling water supply pipe 41*c* and the cooling water discharge pipe 42*c* of the FC 4*c*.

The communication pipe 48*c* is connected between the cooling water supply pipes 41*b* and 41*c*. A first end of the communication pipe 48*c* is connected to the cooling water supply pipe 41*b* on the upstream side of the shut valve 61*b* and on the downstream side of the pump 44*b*, and a second end of the communication pipe 48*c* is connected to the cooling water supply pipe 41*c* on the upstream side of the shut valve 61*c* and on the downstream side of the pump 44*c*. The communication pipe 48*b* connects the cooling water discharge pipes 42*b* and 42*c* to each other, and the communication pipe 48*c* connects the cooling water supply pipes 41*b* and 41*c* to each other. The communication pipes 48*b* and 48*c* are examples of fifth and sixth connection paths.

Selector valves 64*b* and 64*c* are disposed in the communication pipes 48*b* and 48*c*, respectively. The selector valves 64*b* and 64*c* open and close the communication pipes 48*b* and 48*c*, respectively. The selector valves 64*b* and 64*c* are examples of fifth and sixth opening/closing valves disposed in the communication pipes 48*b* and 48*c*, respectively. The cooling water supply pipes 41*b* and 41*c* are communicated with each other by opening the selector valve 64*c*, and the cooling water discharge pipes 42*b* and 42*c* are communicated with each other by opening the selector valve 64*b*.

This structure causes the cooling water to circulate between the cooling water supply pipe 41*b* and the cooling water discharge pipe 42*b*, through which the cooling water circulates, of the FC 4b and the cooling water supply pipe 41c and the cooling water discharge pipe 42c, through which the cooling water circulates, of the FC 4c. Unlike this example, the communication pipe 48b may connect the cooling water supply pipe 41b and the cooling water discharge pipe 42c to each other, and the communication pipe 48c may connect the cooling water supply pipe 41c and the cooling water discharge pipe 42b to each other. Even in this case, as in the case described above, the cooling water circulates between the cooling water supply pipe 41b and the cooling water discharge pipe 42b of the FC 4b and the cooling water supply pipe 41c and the cooling water discharge pipe 42c of the FC 4c.

In addition, an INJ 26c for supplying the anode gas and an air compressor 14c for supplying the cathode gas are connected to the FC 4c. The FC 4c generates electric power by using the anode gas from the INJ 26c and the cathode gas from the air compressor 14c. The FC 4c also includes an anode gas supply system, a cathode gas supply system, and an electric power control system as with the FCs 4a and 4b, but the illustration thereof is omitted.

In this example, the FCs 4a to 4c are generating electric power. The electric power generated by the FC 4a is assumed to be Pa, the electric power generated by the FC 4b is assumed to be Pb, and the electric power generated by the FC 4c is assumed to be Pc.

Arrows indicate the direction in which the cooling water flows. The circulation valves 62a to 62c and the shut valves 61a to 61c are opened, and the bypass valves 63a to 63c are closed. Thus, the cooling water flows from the cooling water discharge pipes 42a to 42c not into the detour pipes 46a to 46c but into the radiators 43a to 43c.

In addition, the selector valves 60a to 60c and 64a to 64c are closed. Thus, the communication pipes 47a to 47c and 48a to 48c are shut-off, and the cooling water does not flow among the cooling systems 40a to 40c. Thus, the cooling water of the cooling systems 40a to 40c circulates between the radiator 43a and the FC 4a, between the radiator 43b and the FC 4b, and between the radiator 43c and the FC 4c, respectively.

Figure 20:
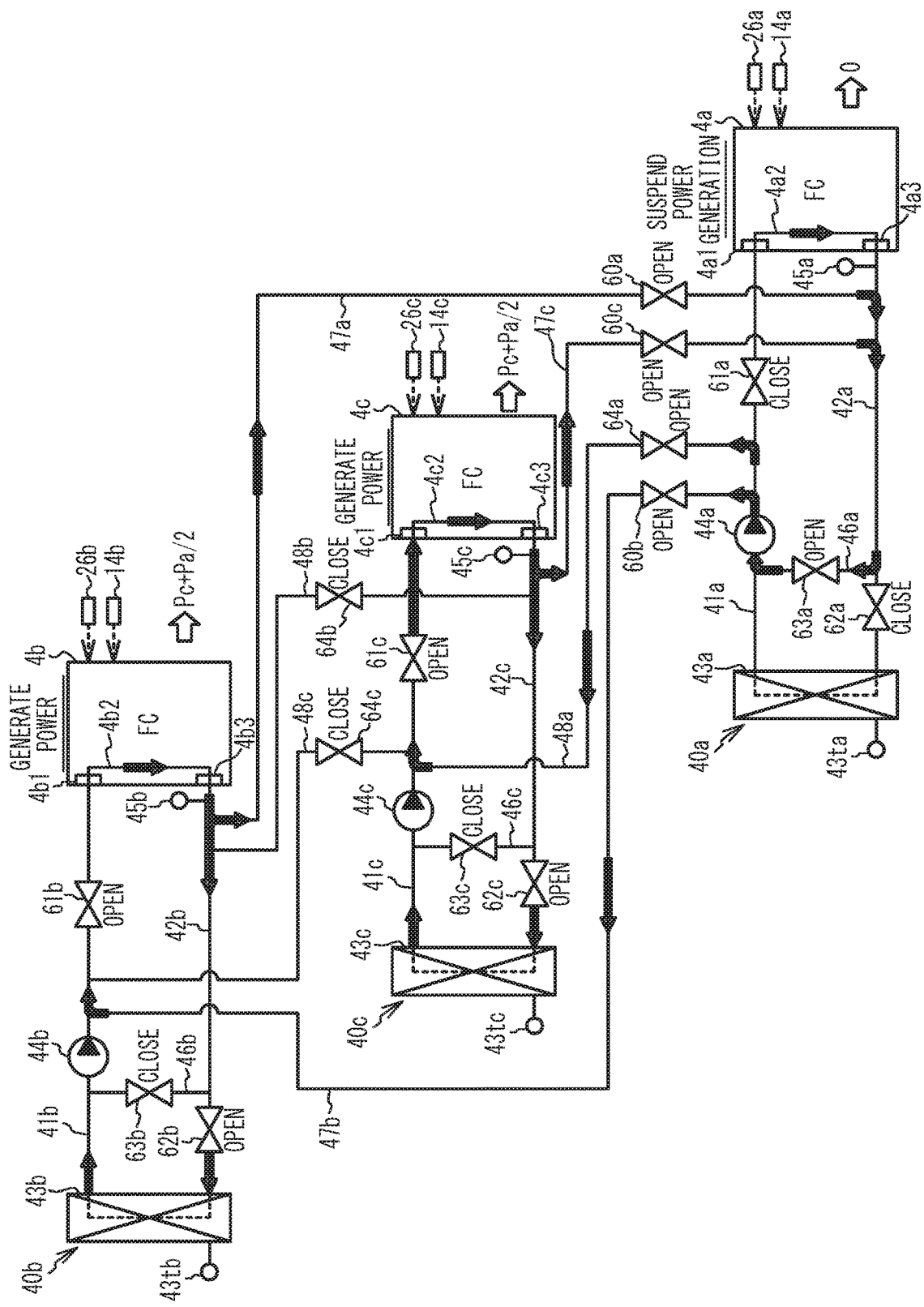
FIG. 20 illustrates a flow of cooling water when power generation of one of the three fuel cells is suspended.

FIG. 20 illustrates a flow of the cooling water when power generation of the FC 4a of the FCs 4a to 4c is suspended. The ECU 2 determines whether there is a possibility of flooding in the FCs 4a to 4c due to the power generation of the FCs 4a to 4c. One exemplary method of determining whether there is a possibility of flooding is comparing the require current values Irq of the FCs 4a to 4c with the threshold value TH.

When determining that there is a possibility of flooding of the FCs 4a to 4c, the ECU 2 suspends the power generation of the FC 4a as an example. The ECU 2 suspends power generation by controlling at least one of the INJ 26a and the air compressor 14a to stop the supply of at least one of the anode gas and the cathode gas to the FC 4a. The ECU 2 maintains the supply of the cathode gas and the anode gas to the FCs 4b and 4c.

In addition, the ECU 2 increases the electric power generated by the FCs 4b and 4c according to the decline in generated electric power due to the suspension of the power generation of the FC 4a. In this case, the ECU 2 controls at least one of the INJ 26b and the air compressor 14b and at least one of the INJ 26c and the air compressor 14c such that the electric power generated by each of the FCs 4b and 4c increases. Thus, the flow rate of at least one of the anode gas and the cathode gas supplied to the FC 4b and the flow rate of at least one of the anode gas and the cathode gas supplied to the FC 4c increase. At this time, since the flow rate of at least one of the anode gas and the cathode gas increases, liquid water produced by the power generation is easily discharged from the gas flow paths of the FCs 4b and 4c. Therefore, occurrence of flooding is inhibited.

Here, the ECU 2 increases the electric power generated by the FCs 4b and 4c such that the decline in generated electric power due to the suspension of the power generation of the FC 4a is compensated for. When it is assumed that the ECU 2 calculates the required current value such that the electric power generated by the FC 4a is equally allocated the FCs 4b and 4c, the electric power to be generated by the FC 4b becomes Pb+Pa/2 and the electric power to be generated by the FC 4c becomes Pc+Pa/2. Thus, the total electric power generated by the FCs 4a to 4c is maintained at that in the state illustrated in FIG. 19.

In addition, the ECU 2 closes the circulation valve 62a and opens the bypass valve 63a. Thus, the cooling water of the cooling system 40a bypasses the radiator 43a and flows through the detour pipe 46a, thereby increasing in temperature. As described above, the ECU 2 may increase the temperature of the cooling water by stopping the radiator 43a instead of opening/closing of the circulation valve 62a and the bypass valve 63a.

In addition, the ECU 2 opens the selector valves 60a to 60c and 64a. Thus, the cooling water circulates between the cooling systems 40a and 40b and the cooling water circulates between the cooling systems 40a and 40c. Thus, the cooling water of the FCs 4b and 4c increases in temperature, and excessive cooling of the FCs 4b and 4c is inhibited. Therefore, flooding of the FCs 4b and 4c is inhibited. In addition, since the flow rates of the cooling water flowing through the FCs 4b and 4c increase because of addition of the cooling water of the FC 4a of which the power generation is suspended, its heat capacity also increases. Therefore, overheating of the cells near the outlets 4b3 and 4c3 of the FCs 4b and 4c is inhibited.

As described above, also in the system 1 including three FCs 4a to 4c, the same advantage as the above is obtained. The present example has described a case where the power generation of the FC 4a is suspended, but even when power generation of the FC 4b or the FC 4c is suspended, occurrence of flooding is inhibited by performing the similar operation to the above.

In addition, in the present example, the ECU 2 suspends the power generation of the FC 4a of the FCs 4a to 4c, but the power generation of two FCs 4a and 4c may be suspended according to the operating status of the system 1.

Figure 21:
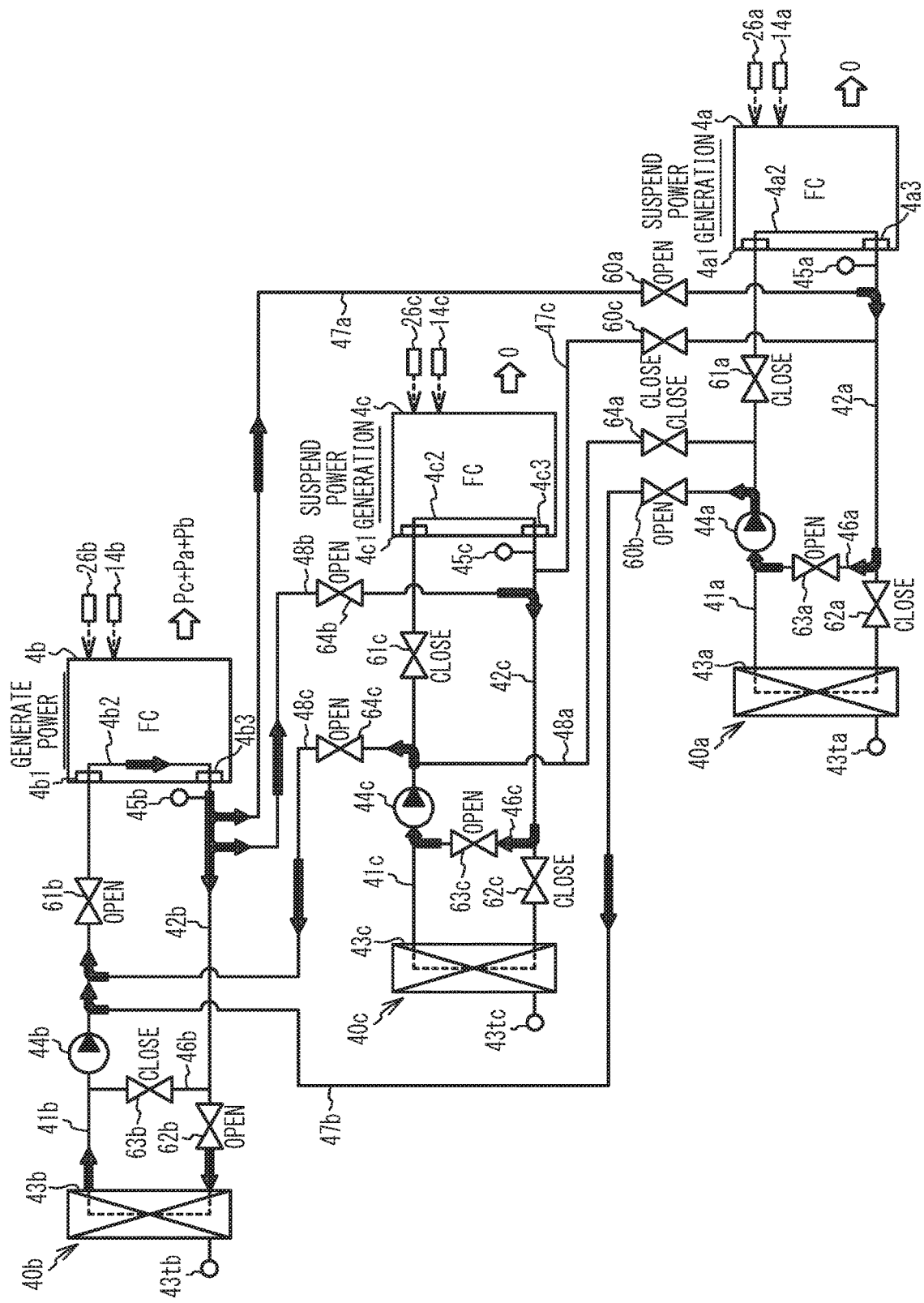
FIG. 21 illustrates a flow of cooling water when power generation of two of the three fuel cells is suspended.

FIG. 21 illustrates a flow of the cooling water when the power generation of two FCs 4a and 4c of three FCs 4a to 4c is suspended. When determining that there is a possibility of flooding in the FCs 4a to 4c, the ECU 2 suspends the power generation of the FC 4a and 4c as an example. In this case, the ECU 2 suspends the power generation of the FC 4a by controlling at least one of the INJ 26a and the air compressor 14a to stop the supply of at least one of the anode gas and the cathode gas to the FC 4a, and suspends the power generation of the FC 4c by controlling at least one of the INJ 26c and the air compressor 14c to stop the supply of at least one of the anode gas and the cathode gas to the FC 4c. The ECU 2 maintains the supply of the cathode gas and the anode gas to the FC 4b.

In addition, the ECU 2 increases the electric power generated by the FC 4b according to the decline in generated electric power due to the suspension of the power generation of the FCs 4a and 4c. In this case, the ECU 2 controls, for example, at least one of the INJ 26b and the air compressor 14b such that the electric power generated by the FC 4b increases. This increases the flow rate of at least one of the anode gas and the cathode gas supplied to the FC 4b. At this time, since the flow rate of at least one of the anode gas and the cathode gas increases, liquid water produced by the power generation is easily discharged from the gas flow path of the FC 4b.

The ECU 2 increases the electric power generated by the FC 4b such that the decline in generated electric power due to the suspension of the power generation of the FCs 4a and 4c is compensated for. Thus, the electric power generated by the FC 4b becomes Pb+Pa+Pc. Thus, the total electric power generated by the FCs 4a to 4c is maintained at that in the state illustrated in FIG. 19.

In addition, the ECU 2 closes the circulation valve 62c and opens the bypass valve 63c. Thus, the cooling water of the cooling system 40c bypasses the radiator 43c and flows through the detour pipe 46c, thereby increasing in temperature. The ECU 2 may increase the temperature of the cooling water by stopping the radiator 43c instead of opening/closing of the circulation valve 62c and the bypass valve 63c as described above. Furthermore, since the ECU 2 closes the circulation valve 62a and opens the bypass valve 63a, the cooling water of the cooling system 40c increases in temperature as in the case in FIG. 20.

In addition, the ECU 2 opens the selector valves 60a, 60b, 64b, and 64c. Thus, the cooling water circulates between the cooling systems 40a and 40b and the cooling water circulates between the cooling systems 40b and 40c. Thus, the cooling water of the FC 4b increases in temperature, and excessive cooling of the FC 4b is inhibited. Therefore, flooding in the FC 4b is inhibited. In addition, since the flow rate of the cooling water flowing through the FC 4b increases because of addition of the cooling water of the FCs 4a and 4c due to the suspension of the power generation, its heat capacity also increases. Thus, overheating of the cell near the outlet 4b3 of the cooling water of the FC 4b is inhibited.

As described above, even when the power generation of two FCs 4a and 4c in the system 1 including three FCs 4a to 4c is suspended, the same advantage as the above is obtained. The present example has described a case where the power generation of the FCs 4b and 4c is suspended. However, also in the case where power generation of other two of the FCs 4a to 4c is suspended, occurrence of flooding is inhibited by performing the same operation as described above.

Although some embodiments of the present invention have been described in detail, the present invention is not limited to the specific embodiments but may be varied or changed within the scope of the present invention as claimed.

What is claimed is:

1. A fuel cell system comprising:
    a first fuel cell and a second fuel cell, each generating electric power by using fuel gas and oxidant gas;
    a first cooling device that cools coolant that has cooled the first fuel cell and a second cooling device that cools coolant that has cooled the second fuel cell;
    a first coolant supply path through which coolant flows from the first cooling device to the first fuel cell;
    a first coolant discharge path through which coolant flows from the first fuel cell to the first cooling device;
    a second coolant supply path through which coolant flows from the second cooling device to the second fuel cell;
    a second coolant discharge path through which coolant flows from the second fuel cell to the second cooling device;
    a first detour path connected between the first coolant supply path and the first coolant discharge path so as to bypass the first cooling device;
    a first adjusting device that adjusts a flow rate of coolant flowing through the first detour path;
    a first connection path connecting one of the first coolant supply path and the first coolant discharge path and one of the second coolant supply path and the second coolant discharge path;
    a second connection path connecting the other of the first coolant supply path and the first coolant discharge path and the other of the second coolant supply path and the second coolant discharge path;
    a first opening/closing valve disposed in the first connection path and a second opening/closing valve disposed in the second connection path; and
    a controller configured to control the first fuel cell, the second fuel cell, the first cooling device, the second cooling device, the first adjusting device, the first opening/closing valve, and the second opening/closing valve,
    wherein the controller is configured to:
        determine whether there is a possibility of occurrence of flooding in the first fuel cell and the second fuel cell due to power generation of the first fuel cell and the second fuel cell, and
        when determining that there is a possibility of occurrence of flooding in the first fuel cell and the second fuel cell, suspend the power generation of the first fuel cell and control the first adjusting device or the first cooling device such that a temperature of the coolant cooling the first fuel cell increases, and open the first opening/closing valve and the second opening/closing valve.

2. The fuel cell system according to claim 1, wherein the controller is configured to stop cooling operation of the first cooling device when suspending the power generation of the first fuel cell.

3. The fuel cell system according to claim 1, wherein the controller is configured to cause the first adjusting device to increase the flow rate of the coolant such that the coolant does not flow through the first cooling device when suspending the power generation of the first fuel cell.

4. The fuel cell system according to claim 1, wherein the controller is configured to increase electric power generated by the second fuel cell according to a decline in generated electric power due to suspension of the power generation of the first fuel cell.

5. The fuel cell system according to claim 1, further comprising:
    a control valve that is disposed in the first coolant supply path and controls a flow of coolant into the first fuel cell,
    wherein the controller is configured to close the control valve when opening the first opening/closing valve and the second opening/closing valve.

6. The fuel cell system according to claim 5, wherein the controller is configured to, after controlling the first adjusting device or the first cooling device such that a temperature of the coolant of the first fuel cell decreases, open the control valve and close the first opening/closing valve and the second opening/closing valve to resume the power generation of the first fuel cell.

7. The fuel cell system according to claim 6, further comprising
a cooling temperature measurement device that measures a temperature of coolant, wherein
the controller is configured to close the first opening/closing valve and the second opening/closing valve and open the control valve when a temperature measured by the cooling temperature measurement device becomes less than a predetermined value after controlling the first adjusting device or the first cooling device such that the temperature of the coolant of the first fuel cell decreases.

8. The fuel cell system according to claim 1, wherein the controller is configured to:
after suspending the power generation of the first fuel cell, determine whether there is a possibility of occurrence of flooding in the second fuel cell due to power generation of the second fuel cell, and
when there is a possibility of occurrence of flooding in the second fuel cell, open the first opening/closing valve and the second opening/closing valve.

9. The fuel cell system according to claim 1, wherein the controller is configured to determine that there is a possibility of occurrence of flooding in the first fuel cell and the second fuel cell when an output current value required of the first fuel cell and the second fuel cell is less than a threshold value.

10. The fuel cell system according to claim 1, further comprising:
a first cell temperature measurement device that measures a temperature of the first fuel cell; and
a second cell temperature measurement device that measures a temperature of the second fuel cell, wherein
the controller is configured to determine that there is a possibility of occurrence of flooding in the first fuel cell and the second fuel cell when a temperature measured by the first cell temperature measurement device or a temperature measured by the second cell temperature measurement is equal to or less than a temperature reference value.

11. The fuel cell system according to claim 10, wherein the controller is configured to determine the temperature reference value according to the output current value required of the first fuel cell and the second fuel cell.

12. The fuel cell system according to claim 1, further comprising:
a first detection device that detects a pressure loss of fuel gas flowing through the first fuel cell; and
a second detection device that detects a pressure loss of fuel gas flowing through the second fuel cell, wherein
the controller is configured to determine a pressure reference value according to the output current value required of the first fuel cell and the second fuel cell, and when the pressure loss detected by the first detection device or the pressure loss detected by the second detection device is greater than the pressure reference value, determine that there is a possibility of occurrence of flooding in the first fuel cell and the second fuel cell.

13. The fuel cell system according to claim 12, further comprising:
a first cell temperature measurement device that measures a temperature of the first fuel cell; and
a second cell temperature measurement device that measures a temperature of the second fuel cell, wherein
the controller is configured to determine that the pressure reference value according to the temperature measured by the first cell temperature measurement device or the temperature measured by the second cell temperature measurement device and the output current value.

14. The fuel cell system according to claim 1, further comprising:
a third fuel cell that generates electric power by using fuel gas and oxidant gas;
a third cooling device that cools coolant that has cooled the third fuel cell;
a third coolant supply path through which coolant flows from the third cooling device to the third fuel cell;
a third coolant discharge path through which coolant flows from the third fuel cell to the third cooling device;
a third connection path connecting one of the first coolant supply path and the first coolant discharge path and one of the third coolant supply path and the third coolant discharge path;
a fourth connection path connecting the other of the first coolant supply path and the first coolant discharge path and the other of the third coolant supply path and the third coolant discharge path; and
a third opening/closing valve disposed in the third connection path and a fourth opening/closing valve disposed in the fourth connection path, wherein the controller is configured to:
determine whether there is a possibility of occurrence of flooding in the first fuel cell, the second fuel cell, and the third fuel cell due to power generation of the first fuel cell, the second fuel cell, and the third fuel cell, and
when determining that there is a possibility of occurrence of flooding in the first fuel cell, the second fuel cell, and the third fuel cell, suspend the power generation of the first fuel cell, control the first adjusting device or the first cooling device such that a temperature of the coolant cooling the first fuel cell increases, and opens the first opening/closing valve, the second opening/closing valve, the third opening/closing valve, and the fourth opening/closing valve.

15. The fuel cell system according to claim 14, wherein the controller is configured to increase electric power generated by the second fuel cell and the third fuel cell according to a decline in generated electric power due to suspension of the power generation of the first fuel cell.

16. The fuel cell system according to claim 14, further comprising:
a second detour path connected between the third coolant supply path and the third coolant discharge path so as to bypass the third cooling device;
a second adjusting device that adjusts a flow rate of coolant flowing through the second detour path;
a fifth connection path connecting one of the second coolant supply path and the second coolant discharge path and one of the third coolant supply path and the third coolant discharge path;
a sixth connection path connecting the other of the second coolant supply path and the second coolant discharge path and the other of the third coolant supply path and the third coolant discharge path;
a fifth opening/closing valve disposed in the fifth connection path and a sixth opening/closing valve disposed in the sixth connection path, wherein
when determining that there is a possibility of occurrence of flooding in the first fuel cell, the second fuel cell, and the third fuel cell, the controller is configured to suspend the power generation of the first fuel cell and the third fuel cell, control the first adjusting device or the first cooling device such that a temperature of the coolant cooling the first fuel cell increases, control the second adjusting device or the second cooling device such that a temperature of the coolant cooling the third fuel cell increases, and open the third opening/closing valve, the fourth opening/closing valve, the fifth opening/closing valve, and the sixth opening/closing valve.

17. The fuel cell system according to claim 16, wherein the controller is configured to increase electric power generated by the second fuel cell according to a decline in generated electric power due to suspension of power generation of the first fuel cell and the third fuel cell.

* * * * *